US008326156B2

(12) United States Patent
Stewart

(10) Patent No.: US 8,326,156 B2
(45) Date of Patent: Dec. 4, 2012

(54) CELL PHONE/INTERNET COMMUNICATION SYSTEM FOR RF ISOLATED AREAS

(75) Inventor: James N. Stewart, Brick, NJ (US)

(73) Assignee: Fiber-Span, Inc., Branchburg, NJ (US)

( * ) Notice: Subject to any disclaimer, the term of this patent is extended or adjusted under 35 U.S.C. 154(b) by 726 days.

(21) Appl. No.: 12/459,731

(22) Filed: Jul. 7, 2009

(65) Prior Publication Data

US 2011/0008042 A1    Jan. 13, 2011

(51) Int. Cl.
*H04J 14/02* (2006.01)
*H04B 10/00* (2006.01)

(52) U.S. Cl. .......................................... 398/83; 398/115
(58) Field of Classification Search .................... 398/115
See application file for complete search history.

(56) References Cited

U.S. PATENT DOCUMENTS

| | | | |
|---|---|---|---|
| 5,682,256 A | 10/1997 | Motley et al. | 398/115 |
| 6,388,782 B1 | 5/2002 | Stephens et al. | 359/124 |
| 6,405,018 B1 | 6/2002 | Reudink et al. | 455/20 |
| 6,674,966 B1 | 1/2004 | Koonen | 398/70 |
| 6,690,916 B1 | 2/2004 | Yenerim | 455/11.1 |
| 6,826,163 B2 | 11/2004 | Mani et al. | 370/334 |
| 6,826,164 B2 | 11/2004 | Mani et al. | 370/334 |
| 6,831,901 B2 | 12/2004 | Millar | 370/315 |
| 6,873,823 B2 | 3/2005 | Hasarchi et al. | 455/11.1 |
| 6,965,773 B2 | 11/2005 | Basson et al. | 455/445 |
| 7,038,540 B2 | 5/2006 | Gurvich et al. | 330/151 |

(Continued)

FOREIGN PATENT DOCUMENTS

EP      0391597      10/1990

OTHER PUBLICATIONS

Chu et al., "Fiber Optic Microcellular Radio", Vehicular Technology Conference, 1991. Gateway to the Future Technology in Motion, 41st IEEE, May 19-22, 1991 pp. 339-344.

*Primary Examiner* — Shi K Li
(74) *Attorney, Agent, or Firm* — Watov & Kipnes, P.C.; Kenneth Watov

(57) ABSTRACT

A communication system for providing downlink and uplink communication between Service Providers, and users located in RF remotely located isolated areas, includes the sequential series connection of Service Provider signal sectors to Radio Interface Modules (RIM's), Service Combiner Units (SCU's), Fiber Transceiver Units (FTU's), Optical Multiplexer Units (OMU's), and Remote Fiber Nodes (RFN's), with only the RFN's being located in the RF isolated areas. The RIM's provide level control of RF signals bidirectional flowing between the Service Providers and SCU's. The SCU's both multiplex and split received downlink RF signals for inputting to the FTU's, and also combine and split RF uplink signals received from the FTU's for feed to the RIM's. The FTU's convert downlink RF signals into optical signals, and split the optical signals for connection to the OMU's. The FTU's also convert uplink optical signals received from the OMU's into uplink RF signals for connection to the SCU's. The OMU's combine downlink optical signals received from the FTU's for inputting into the RFN's, and demultiplex uplink optical signals received from the RFN's for connection to the FTU's. The RFN's convert downlink optical signals into RF signals, and amplify and feed these signals into an antenna system. The RFN's also receive RF uplink signals from devices of users in RF isolated areas, and converts the RF uplink signals into optical uplink signals for connection to the OMU's.

18 Claims, 18 Drawing Sheets

U.S. PATENT DOCUMENTS

| | | |
|---|---|---|
| 7,062,224 B2 | 6/2006 | Baker et al. .................... 455/9 |
| 7,096,000 B2 | 8/2006 | Yano ............................ 455/345 |
| 7,119,676 B1 | 10/2006 | Silverstrim et al. ............ 340/531 |
| 7,127,175 B2 | 10/2006 | Mani et al. .................... 398/115 |
| 7,139,580 B2 | 11/2006 | Stein et al. ................. 455/456.1 |
| 7,173,922 B2 | 2/2007 | Beach ........................... 370/338 |
| 7,177,643 B2 | 2/2007 | Howard ....................... 455/445 |
| 7,233,771 B2 | 6/2007 | Proctor, Jr. et al. .......... 455/11.1 |
| 7,239,871 B2 | 7/2007 | Shamp et al. ............... 455/422.1 |
| 7,248,876 B2 | 7/2007 | Hirvonen .................... 455/446 |
| 7,263,293 B2 | 8/2007 | Ommodt et al. ............. 398/115 |
| 7,269,418 B2 | 9/2007 | Kayashima et al. ........ 455/432.2 |
| 7,277,009 B2 | 10/2007 | Hall et al. ................. 340/539.22 |
| 7,317,708 B2 | 1/2008 | Moon et al. .................. 370/331 |
| 7,342,455 B2 | 3/2008 | Behzad et al. ............... 330/289 |
| 7,359,674 B2 | 4/2008 | Markki et al. ............... 455/41.2 |
| 7,376,113 B2 | 5/2008 | Taylor et al. ................. 370/338 |
| 7,376,389 B2 | 5/2008 | Bassiri et al. .................... 455/7 |
| 7,469,105 B2 | 12/2008 | Wake et al. .................. 398/171 |
| 7,548,695 B2* | 6/2009 | Wake ............................. 398/71 |
| 8,040,844 B2* | 10/2011 | Olexa et al. .................. 370/329 |
| 2002/0028655 A1 | 3/2002 | Rosener et al. ................ 455/16 |
| 2002/0128009 A1 | 9/2002 | Boch et al. .................... 455/426 |
| 2003/0078037 A1 | 4/2003 | Auckland et al. ............. 455/422 |
| 2003/0083008 A1 | 5/2003 | Baker et al. .................... 455/17 |
| 2003/0143948 A1 | 7/2003 | Han et al. ..................... 455/11.1 |
| 2004/0219930 A1 | 11/2004 | Lin ............................. 455/456.1 |
| 2005/0238049 A1 | 10/2005 | Delregno ..................... 370/466 |
| 2005/0243785 A1 | 11/2005 | Sabat, Jr. et al. .............. 370/338 |
| 2005/0286479 A1 | 12/2005 | Spencer ........................ 370/338 |
| 2006/0052099 A1 | 3/2006 | Parker ........................ 455/426.1 |
| 2006/0057982 A1 | 3/2006 | Inamori et al. .............. 455/127.2 |
| 2006/0193354 A1* | 8/2006 | Rosenblatt ................ 372/29.023 |
| 2006/0286983 A1 | 12/2006 | Otsuka et al. .................. 455/444 |
| 2007/0066220 A1 | 3/2007 | Proctor, Jr. et al. .......... 455/11.1 |
| 2007/0097945 A1 | 5/2007 | Wang et al. ................... 370/349 |
| 2007/0111698 A1* | 5/2007 | Mysore et al. ................ 455/338 |
| 2007/0264009 A1 | 11/2007 | Sabat, Jr. et al. .................. 398/5 |
| 2007/0268846 A1 | 11/2007 | Proctor, Jr. et al. ........... 370/279 |
| 2007/0275657 A1 | 11/2007 | Chang et al. ...................... 455/9 |
| 2008/0043687 A1 | 2/2008 | Lee ............................... 370/338 |
| 2008/0132273 A1 | 6/2008 | Sabat et al. ................. 455/552.1 |
| 2008/0137624 A1 | 6/2008 | Silverstrim et al. ........... 370/338 |
| 2009/0191891 A1 | 7/2009 | Ma et al. ..................... 455/456.1 |
| 2009/0232510 A1* | 9/2009 | Gupta et al. .................. 398/136 |
| 2009/0317087 A1* | 12/2009 | Bernard et al. ............... 398/135 |
| 2010/0048163 A1 | 2/2010 | Parr et al. ................... 455/404.2 |
| 2010/0278530 A1* | 11/2010 | Kummetz et al. ............... 398/41 |
| 2010/0311424 A1* | 12/2010 | Oga ............................... 455/440 |

* cited by examiner

CELL PHONE/INTERNET COMMUNICATION SYSTEM FOR RF ISOLATED AREAS

FIELD OF THE INVENTION

The present invention is broadly related to RF communications systems, and more particularly related to RF/Optical Communication systems for permitting RF isolated areas to communicate with the outside world.

BACKGROUND OF THE INVENTION

Over the past ten years there has been a dramatic worldwide expansion in the use of wireless communication devices, such as cell phones and laptop computers, for example. However, users of such devices must be located in areas receptive of Radio Frequencies (RF) signals, whereby such users can have wireless bidirectional communication with other users. For example, cell phone signal carriers, such as Verizon, Sprint, and others, employ cell phone antenna towers for permitting their subscribers to use their cell phones, and other wireless electronic communication devices, for communicating with other users. The mode of communication can be voice transmission or data transfer, via the Internet, and/or via the aforesaid carriers, for example.

An ongoing problem for users of cell phones, laptop computers, for example, is that such devices cannot be used in areas that are isolated from RF signals. These RF dead areas include subterranean enclosed areas such as subway tunnels, mines, parking lots, underwater tunnels, mountain passage tunnels, and so forth, for example. Although some progress has been made in developing systems for permitting the reception and transmission of RF signals in such enclosed areas, there is a long felt need in the art for systems that are reliable, cost effective, permit communication relative to a large number of personal communication services, advanced wireless services, and other services such as Data Services. All of these service providers require the use of radio signals at different frequencies or bands or subbands, further complicating the design of such communication systems.

SUMMARY OF THE INVENTION

An object of the invention is to provide an improved communication system for permitting users of wireless devices to communicate with other users or service providers from areas or regions that would be otherwise isolated from RF signals.

Another object of the invention is to provide such a communication system that utilizes the benefits of fiber optic signal transfer, and provides improved reliability. The hardware solution addresses the need to interface to multiple base stations, to organize carrier signals for efficient optical transport to and from remote RF Nodes. This is accomplished using a highly configurable modular approach that eases system design and provides enhanced serviceability.

With the problems in the prior art in mind, with the aforesaid and other objects to be provided, the present System includes means for providing users of electronic devices the ability to unidirectionally and bidirectionally communicate with personal communication services, advanced wireless communication services, and other present and future Data Services, from areas that would be otherwise isolated from RF signals. To accomplish this, the present System includes Radio Interface Modules (RIM) for routing or bidirectionally connecting RF signals from these providers to Service Combiner Units (SCU) for multiplexing or combining various groups of signals associated with the effective service providers, bidirectionally connecting the multiplexed RF signals to Fiber Transceiver Units to convert the RF signals into optical signals, whereas the Fiber Transceiver Units are also operative to receive optical signals associated with transmissions from users, and converting these optical signals back into RF signals for connection to the associated Service Combiner Units for processing and transfer to the appropriate RIM Units, and therefrom back to the appropriate or designated carriers or Service Groups. The optical signals from the FTU Units or modules are fed to an Optical Multiplex Unit (OMU), which in one direction acts to multiplex a certain number of the signals together for connection to Remote Fiber Nodes (RFN), respectively. The RFN's are located in normally dead zone RF areas or regions, and include means for converting the optical signals into RF signals for connection to an antenna system to permit users to receive the signals on their electronic devices. Also, communication signals transmitted by the users are received by the antennas and fed to the designated RFN, which further includes means for converting the RF signals from the users into optical signals for transfer to an associated OMU. The OMU includes means for directly connecting selected ones of these user signals from the RFN to a designated OMU, and for demultiplexing other of these signals for connection to the designated FTU. The designated FTU Units convert the signals received from the OMU from optical signals into RF signals which are fed to a designated SCU. Designated SCU Units include means for processing the received signals and connecting them to a designated RIM module for transfer to the Service Group or groups with whom the users are communicating through, typically as subscribers. Depending upon the size of the dead zone area, serviced by the present System, one or more RFN Nodes may be required.

BRIEF DESCRIPTION OF THE FIGURES

The present System is described in detail below with reference to the drawings, in which like items are identified by the same reference designation, wherein.

DETAILED DESCRIPTION OF THE INVENTION

The general configuration of the invention will first be described broadly, and then followed by a more detailed description. With reference to FIGS. 1 through 4, the present System includes Carrier Equipment 1 that in this example includes Service Group 1 (SG1) associated with PCS (personal communication service) and cellular sectors. More specifically, eight base sectors are shown, and include sectors PCS-A through PCS-F, Cell-A, and Cell-B, respectively. Another Service Group designated Service Group 2 (SG2) has eight base station sectors for providing Advanced Wireless Service (AWS) and 900 Megahertz (MHz) sectors, shown as sectors AWS-A through AWS-F, 900-A, and 900-B, respectively. A third Service Group shown as Service Group 3 (SG3) provides Sectors for 700 MHz, 800 MHz, and Data Services, including Sectors 700-LA, 700-LE, 700-UC, 800-A, 800-B, BRS, EBS, and WiMax. For Service Group SG1, for example, the sector PCS-A might be Verizon PCS, and Cell-A might be Verizon Cellular. Similarly, other of the sectors may be provided by carriers such as T-Mobile, Nextel, Sprint, and so forth. The sectors associated with Service Group SG2 might be provided by similar carriers for the data portions of cellular transmission, that is cell phone transmission, and the 900-A sector might be a Nextel Band 900 MHz. For Service Group SG3, there are 700-LA, LB, and LC sectors that are associated with FCC (Federal Communication Commission) portions of the ultra high frequency (UHF) will be available for future Data Services. Sectors 800-A and 800-B are associated with Nextel's walkie-talkie features. The BRS and EBS sectors are associated with Data Services. The WiMax sector is associated with data towers, broadband, Internet service. It should be noted that although in this example of the present System three Service Groups are shown which each have eight base station sectors, the present System 200 is not so limited, and can be expanded to include additional Service Groups and sectors, and additional sectors for each Service Group. Other portions of the System 200 can similarly be expanded.

Each of the three Service Groups, SG1 through SG3, have their aforesaid respective eight sectors connected for bidirectional signal transfer with Radio Interface Modules (RIM)1 through 8, as shown for Radio Interface Systems RIS1 through RIS3, respectively, as shown. In this example, Radio Interface Systems RIS1 through RIS3 are configured to handle from one Radio Frequency Node (RFN) to thirty-two RFN's, which are described in greater detail below. RIS1 through RIS3 are interconnected, as shown, and from RIS3 through an RIS Master Controller (not shown) to an Ethernet Switch 54. In this manner, RIS1 through RIS3 are each connected to Ethernet Switch 54.

Figure 5:
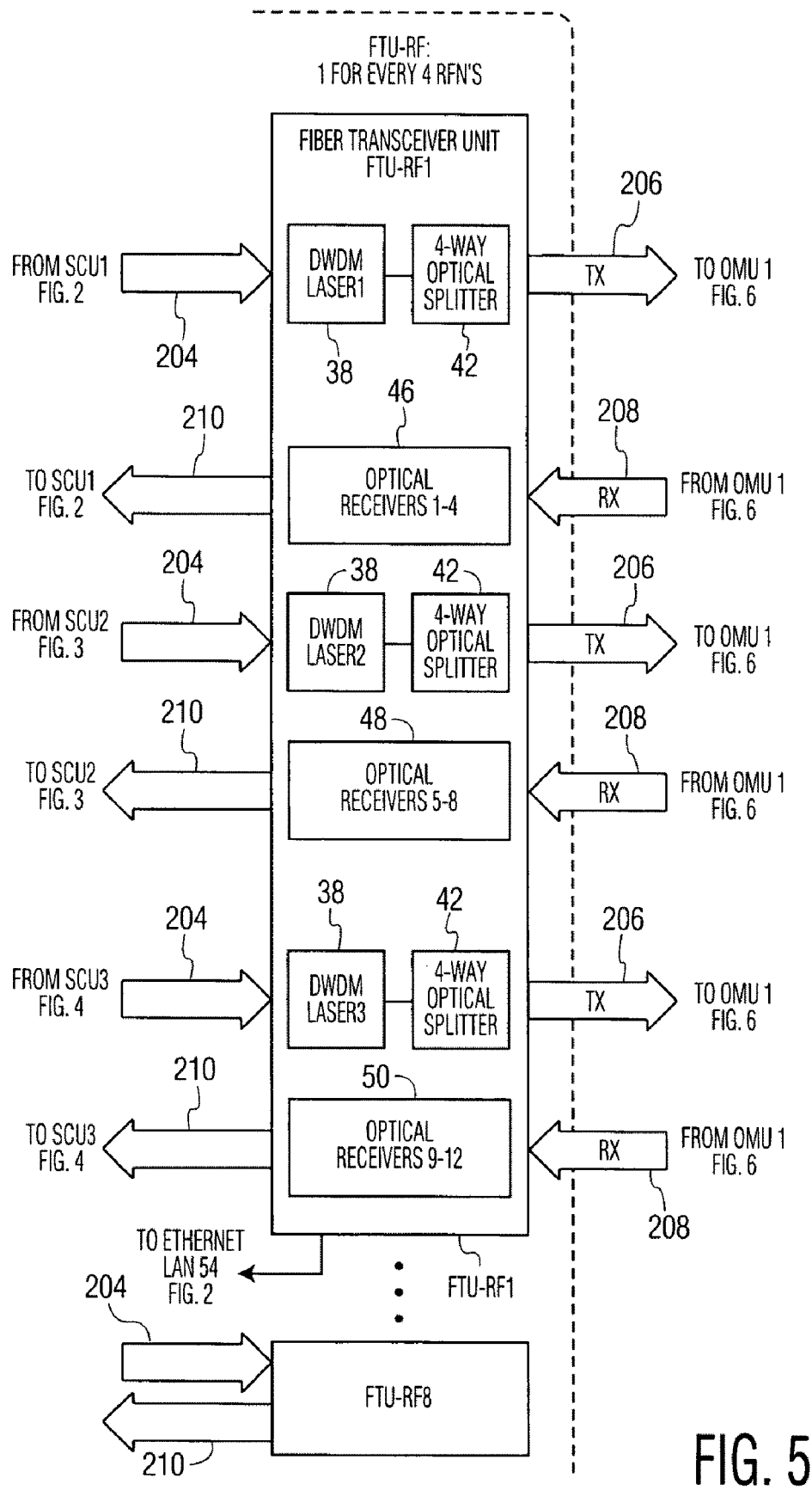

Three Service Combiner Units SCU1 through SCU3, respectively, are included in this example. SCU1 is associated with PCS/cellular services of SG1, SCU2 with AWS/900 MHz services of SG2, and SCU3 with 700 MHz/800 MHz/ WiMax services of SG3, as shown. SCU1 through 3 each receive signals from RIM1 through RIM8 Radio Interface Modules of RIS1 through RIS3, respectively. As shown in FIG. 5, each SCU1 through 3 combines these signals, and each feeds these signals to a Fiber Transceiver Unit (FTU) referred as FTU-RF1. Note that the three Service Combiner Units SCU1 through SCU3 can each handle signaling associated with from one to thirty-two RFN's, shown as RFN1 through RFN32 (see FIGS. 1 through 4) in this example. Each FTU or Fiber Transceiver Unit can handle signaling associated with one through four RFN's, meaning for this example that FTU-RF1 through FTU-RF8 would be required in this example for handling signaling associated with RFN1 through 4, RFN5 through 8, RFN9 through 12, RFN13 through 16, RFN17 through 20, RFN21 through 24, RFN25 through 28, RFN29 through 32, respectively. The Fiber Transceiver Units FTU-RF1 through 8 are operative to convert Radio Frequency (RF) signals received from SCU1 through SCU3, respectively, into optical signals which are fed to Optical Multiplexer Units (OMU) 1 through 4, in this example, for RFN1 through RFN32. OMU1 is configured to handle signaling with RFN1 through RFN8 (only RFN1 through RFN4 and RFN32 are shown for the sake of simplicity). Similarly, OMU2 would handle signaling with RFN9 through 16, OMU3 for handling signaling with RFN17 through RFN24, and OMU4 for handling signaling with RFN25 through RFN32 (only RFN1 through RFN4 and RFN32 are shown for sake of simplicity). In this example, OMU1 is configured to multiplex optical signals from FTU-RF1 and FTU-RF2 together, and feed the multiplexed optical signals to at least RFN1, and, if necessary, to RFN1 through 8, respectively, in this example. Similarly, OMU Unit 2 is configured in this example to multiplex optical signals from FTU-RF3 and 4 and feed them to RFN's 9 through 16. Similarly, OMU 3 multiplexes signals from FTU-RF5 and 6, and feeds the multiplexed signals to RFN17 through RFN24; and OMU4 multiplexes signals from FTU-RF7 and 8, and feeds the multiplexed signals to RFN25 through 32.

Figure 1:
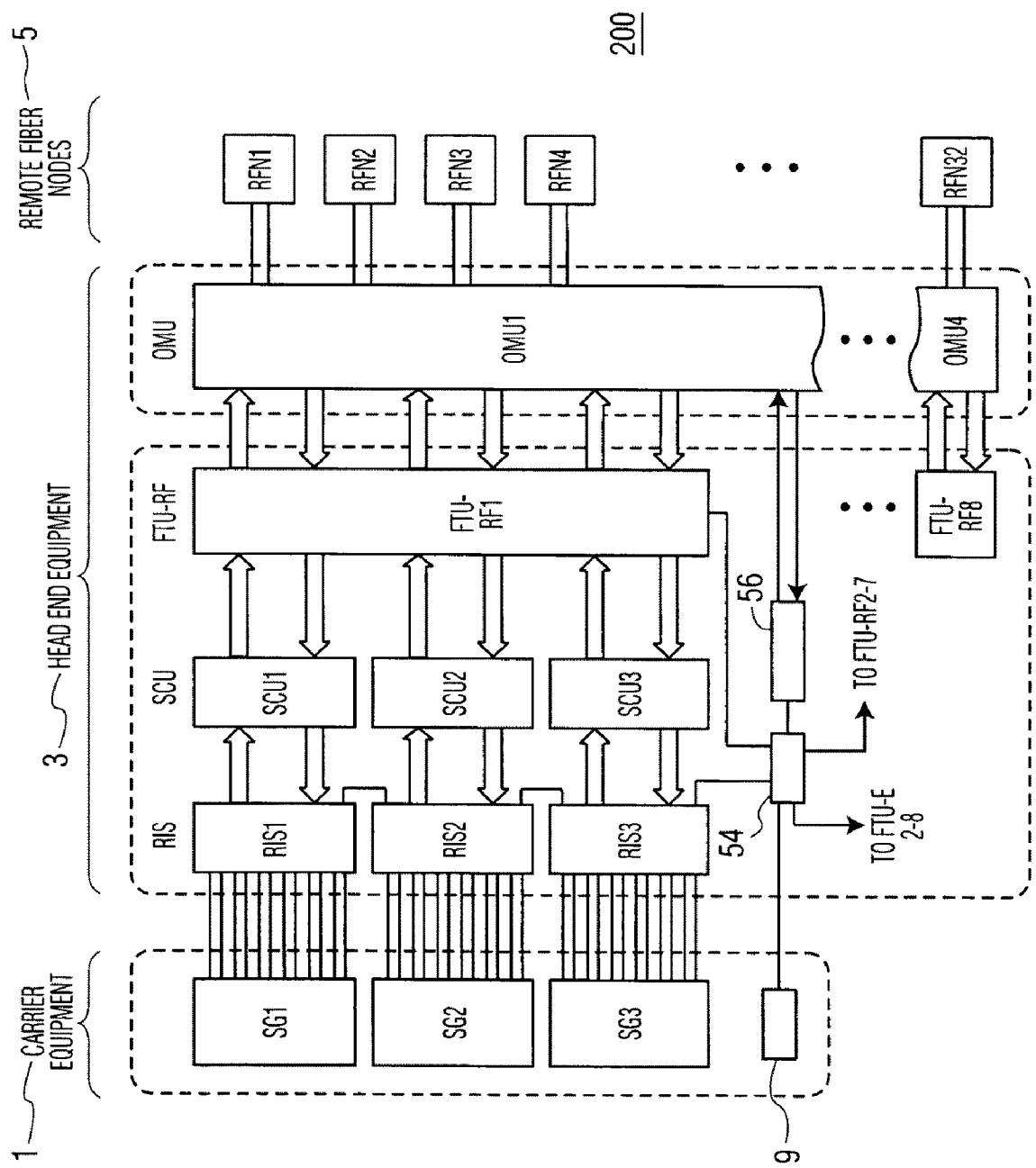
FIG. 1 is a simplified block diagram of the present System.
Figure 6:
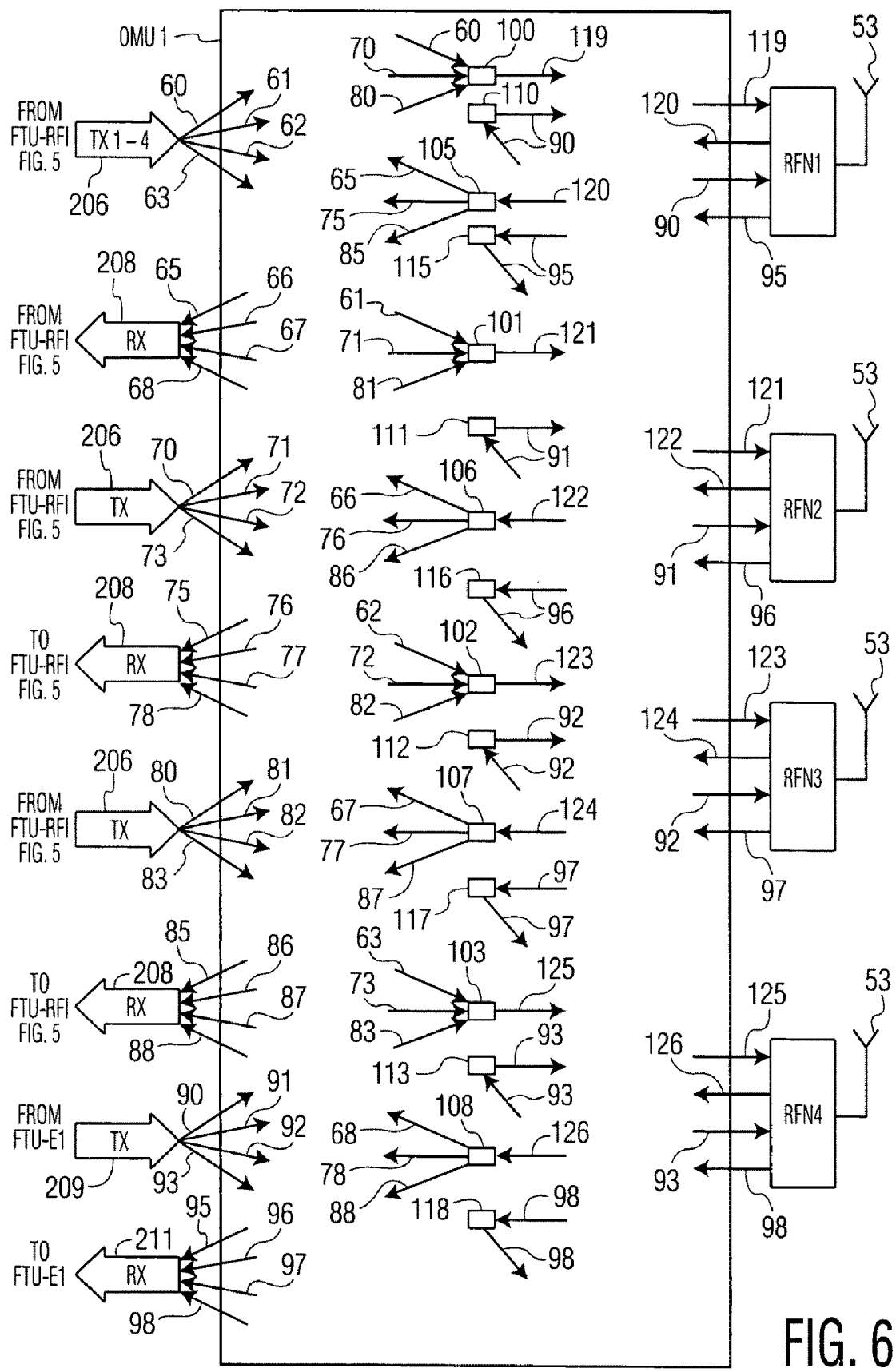

As indicated, an example of the present System of FIG. 1 can be configured with at least one Radio Frequency Node RFN1, and up to thirty-one additional Remote Fiber Nodes RFN2 through 32. As shown in FIG. 6, RFN1 through 4, for example, is individually connected to typically at least one ceiling mounted antenna 53. Typically, the Remote Fiber Nodes RFN1 through RFN32 are hung from the ceilings of enclosed spaces to be serviced or pole mounted, and are connected by fiber optic cables to their associated OMU1 through 4, in this example. The antennas 53 associated with each RFN1 through 3 are typically ceiling mounted omnidirectional antennas, but can be otherwise mounted at a height. Also, in certain configurations three antennas 53 can be connected to each RFN, serving as right side, center, and left side antennas 53, respectively.

Each RFN1 through RFN32, in this example, is configured to convert the optical signals it -receives from its associated OMU Unit 1 through 4, and convert these signals into RF signals which are fed to an associated antenna 53 to be transmitted to cell phone and laptop users located within the range of the particular RFN1 through 32. The users can receive the signals on devices such as laptop computers, cell phones, Blackberry devices, iPhones, and so forth. The users can generate signals on their devices to be transmitted to antennas 53, which users signals are then converted from RF signals to optical signals by their associated RFN1 through RFN32, respectively. User optical signals are then fed over a fiber optic cable back to the associated OMU1 through 4 from a given RFN1 through 32. The associated OMU1 through 4 then demultiplexes the user's signals, and feeds them to an associated one of FTU-RF1 through FTU-RF8, respectively. In the present System 200 configured for servicing RFN1 through RFN32, FTU-RF1 through FTU-RF8 are configured for converting the demultiplexed optical carrier signals into RF signals, and feeding these signals to Service Combiner Units SCU1 through SCU3, respectively. Each SCU1 through SCU3 combines the user generated RF signals each receives, and feeds them over appropriate RF cables to Radio Interface Systems of RIS1 through RIS3, respectively, as shown. The RIM1 through RIM8 Modules of each RIS through RIS3 are configured to insure that the signals received from Service Groups SG1 through SG3, and user signals received from OMU1 through OMU4 are maintained at a proper signal level. RIS1 through RIS3 feed the remote controlled user generated signals to appropriate sectors of Service Groups 1 through Service Group SG3, respectively, as shown.

In the Carrier Equipment 1, a WAN/Internet Connectivity 9 is included for bidirectionally receiving and transmitting signals to Ethernet/LAN 54. Also as shown, Ethernet/LAN 54 also is operative for bidirectional signaling with Radio Interface Systems RIS1 through RIS3, and Fiber Transceiver Units FTU-RF1 through FTU-RF8, as shown. Note that each of RIM1 through RIM8 of RIS1 through RIS3, respectively, are modules which plug into a backplane (not shown). Each RIM includes a microprocessor (not shown) programmed for processing signals to an RIS Master Controller (not shown) which communicates with an Ethernet Switch 54. In each of RIS1, RIS2, and RIS3, each associated group of RIM1 through RIM8, contain an embedded microcontroller (not shown) that serially communicates with a bus (not shown) connected to RIS1 through RIS3 serially. One RIS controller plug-in (not shown) manages all RIM plug-ins from RIS1-RIS3 using the serial bus. The RIS controller converts the data into an Ethernet signal to be routed to Ethernet switch 54. Ethernet Switch 54 also has bidirectional signal communication with Internet Fiber Transceivers FTU-E1 through FTU-E8. FTU-E1 through FTU-E8 convert RF signals into optical signals for connection via fiber optic cables to RFN's 1 through 4, 5 through 8, 9 through 12, 13 through 16, 17 through 20, 21 through 24, 25 through 28, and 29 through 32, respectively, via OMU1 through OMU4, respectively, as shown. Also, the Ethernet Fiber Transceivers FTU-E1 through FTU-E8 receive optical signals from their associated Remote Fiber Nodes via Optical Multiplexer Units 1 through 4, as shown, and convert these signals into RF signals for transmission to the Ethernet Switch 54. Note that the fiber optic cables 90 through 93 for feeding downlink optical signals from OMU1 to RFN1 through RFN4, and fiber optic cables 95 through 98 for feeding uplink optical signals from RFN1 through RFN4 to OMU1, are representative of the cable connections between OMU1 through OMU4, and RFN's 5-8, 9-16, 17-24, and 25-32, respectively, in this example.

With reference to the block schematic diagrams of the present inventive System 200, as shown in FIGS. 1 through 7, in this example, the present System 200 is configured to include up to thirty-two RFN's or Remote Fiber Nodes 1 through RFN32, each of which is identical in design as will be further described below. Depending upon the size of an area to be serviced by the present System 200, the area may require one or more Remote Fiber Nodes. Each RFN1-RFN32 covers an area determined by both the power output from an RFN and the associated antenna configuration. Typically, an area covering from 7,200 square feet to about 15,000 square feet is covered, for an RFN RF power output of about two watts composite RF power. Note that the System 200 is not meant to be so limited, and can be configured to include just one RFN, or more than thirty-two RFN's, that is from one to any number of RFN's up to a practical limit. The System 200, as described herein, can be replicated for every thirty-two RFN's.

As previously mentioned, Carrier Equipment 1 to be used or serviced is shown in FIGS. 1-4 to be divided into a Service Group SG1 providing personal communication services (PCS) and cellular service; a second Service Group SG2 associated with advanced wireless service (AWS); and a third Service Group SG3 associated with 700 megahertz (MHz), 800 MHz, and Data Services. Also included in the Carrier Equipment 1 is a wide area Network (WAN) and Internet connectivity point 9. The Service Group SG1 is connected for bidirectional electrical signaling with a Radio Interface System RIS1, SG2 for bidirectional signaling with RIS2, and SG3 for bidirectional signaling with RIS3, as shown. RIS1 through 3 are connected for bidirectional electrical signaling with Service Combiner Units SCU1 through SCU3, respectively. In this example, as described above, RIS1 through RIS3, and SCU1 through SCU3, are each designed to handle carrier and user signals (downlink and up link signals) for up to thirty-two RFN's. SCU1 through SCU3 are connected for bidirectional RF signal transfers with up to eight FTU Units FTU-RF1 through FTU-RF8. Each FTU-RF Unit is designed, in this example, to handle the signaling associated with up to four RFN Nodes. Accordingly, if the maximum number of RFN Nodes RFN1-RFN32 are used in the System 200, then four FTU-RF Units will be required. As shown, two FTU-RF Units are connected for bidirectional signaling with one Optical Multiplexer Unit (OMU) to service eight RFN's. Accordingly, in this example, one OMU Unit is designed for connection to two FTU-RF Units, and further for bidirectional signaling connection with up to eight RFN Nodes. Accordingly four OMU Units 1-4 are required in this example to handle RFN Nodes RFN1 through RFN32.

With further reference to FIGS. 1-5, as indicated, the Carrier Equipment 1 also includes a WAN/Internet connectivity 9 which is connected for bidirectional signaling to an Ethernet Switch 54. The Ethernet Switch 54 is also connected via an individual signal line for bidirectional signaling with RIS Systems RIS1-3, respectively, as shown and previously described. The Ethernet Switch 54 also has an individual bidirectional signal connection with FTU-RF1. Also, Ethernet Switch 54 has a bidirectional signaling connection to an Ethernet Fiber Transceiver (FTU-E) 56 for converting electrical signals from Ethernet Switch 54 into downlink optical signals on four optical output lines 90-93 which are connected to the OMU1 for connection to the four RFN Nodes RFN1-RFN4, in this example. Also, FTU-E is receptive of four uplink signal lines 95-98 carrying user signals from OMU1, as generated from selective ones of the four RFN Nodes RFN1-RFN4, as shown in this example. The FTU-E1 Transceiver converts the user generated optical signals into electrical signals for connection to the Ethernet Switch 54. Also, as shown, the Ethernet Switch 54 can be connected to up to an additional seven FTU-E Transceivers FTU-E2-8 for expanding use of the System 200 with RFN Nodes RFN's 1-032, in this example. For the same reasons, the Ethernet Switch 54 can also be connected to up to an additional seven FTU-RF Transceivers FTU-RF2-7, respectively. Each FTU-RF Transceiver includes an Ethernet connected master controller (not shown) that communicates with Internal Fiber Transceivers for Ethernet connectivity.

Figure 2:
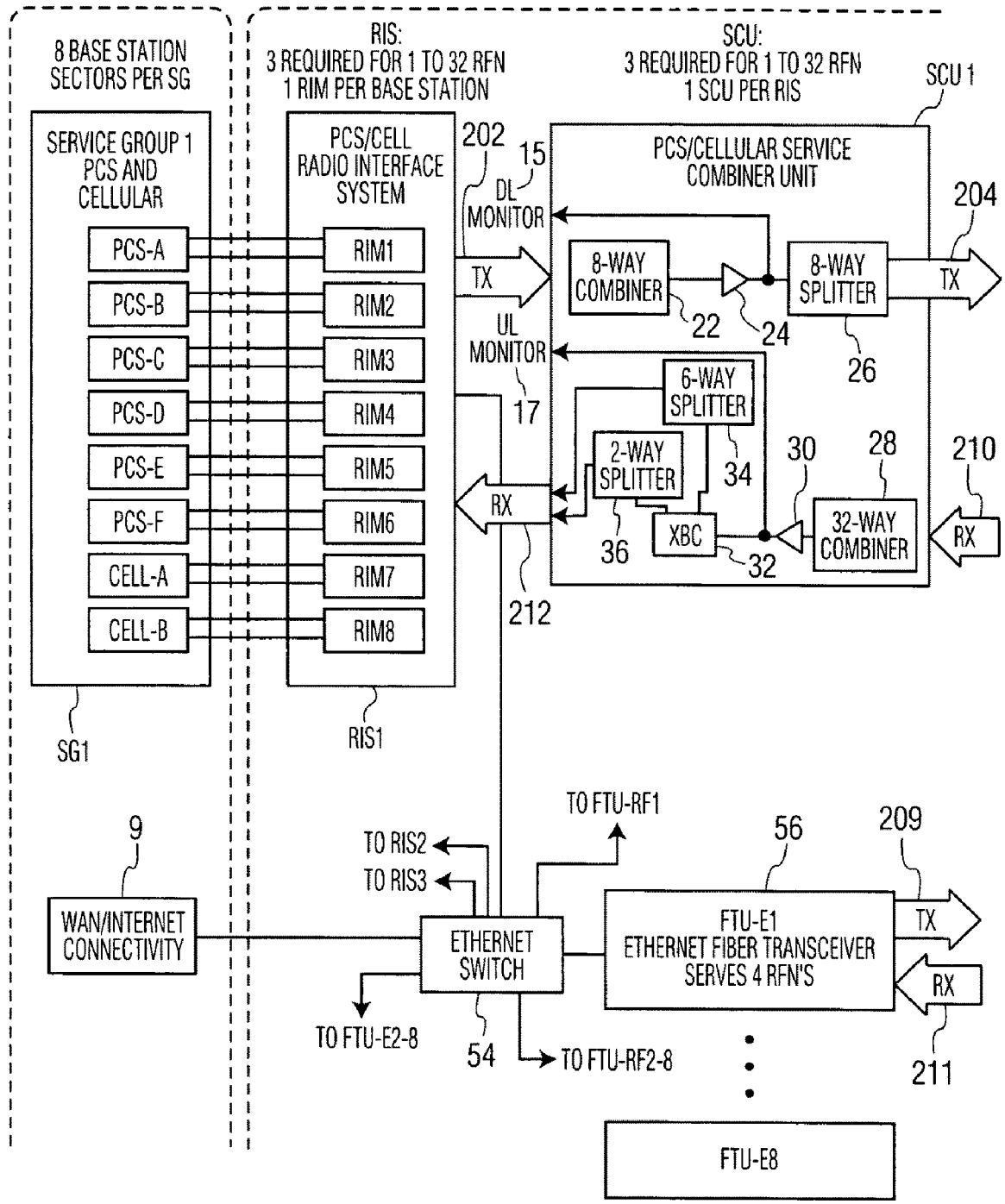
FIGS. 2 through 7 show more detailed block schematic diagrams of the Carrier Equipment, and head end equipment subsystems of the System of FIG. 1.
Figure 3:
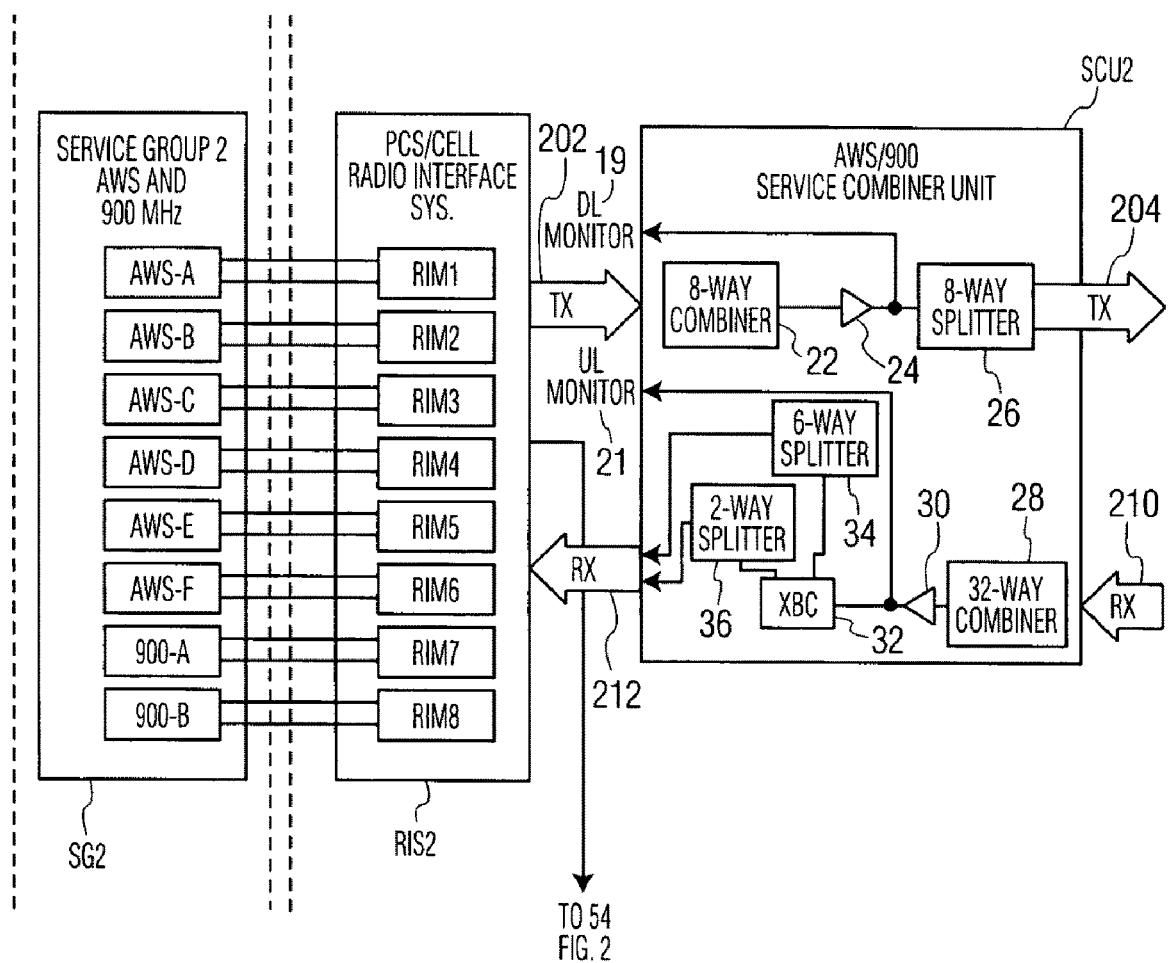
Figure 4:
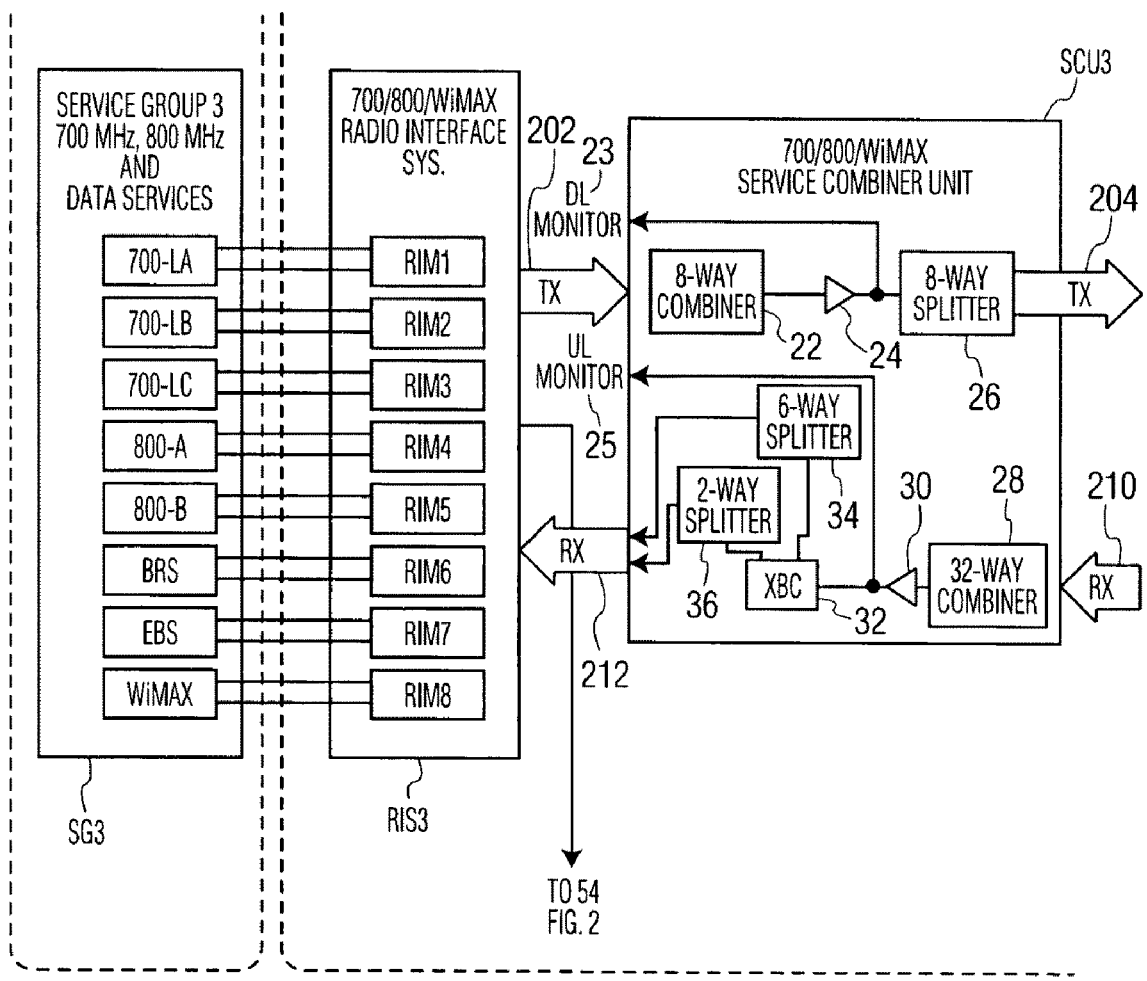

Further operation of the System 200 will now be described with yet further reference to FIGS. 1-7. Service Group SG1, in this example, includes individual base station sectors for personal communication services PCS-A through PCS-F, respectively, and cellular service Cell-A and Cell-B, which are connected for bidirectional signaling through Radio Interface Modules RIM1 through RIM8 of RIS1. Signals from RIM1 through RIM8 are connected via a TX cable 202 to individual inputs of an 8-way combiner 22 in SCU1. The output of combiner 22 is amplified through an amplifier 24 and fed to an 8-way splitter 26 of SCU1. The output of amplifier 24 can also be tapped off for providing a downlink (DL) monitor signal 15 for maintenance purposes. Accordingly, each of the eight signal output lines from the 8-way splitter 26 carried in electrical cable 204 provides the combined eight signals from the 8-way combiner 22. For the present System 200 fully configured to accommodate thirty-two Remote Fiber Nodes RFN1-RFN32, in this example, each of the individual output signal lines from the 8-way splitter 26 are connected via cable 204 to the input of a dense wavelength division multiplexer (DWDM) laser 38 of eight individual FTU-RF Units FTU-RF1-8, respectively. The other seven output signal lines from splitter 26 are included for system expansion, for example. With reference to FIGS. 2 and 5, the one output signal line from the 8-way splitter 26 is connected to the inputs of three DWDM laser 38, in this example, of a first FTU-RF1, as shown. Each laser 38 converts the combined electrical signal received from splitter 26 into an optical signal, and feeds the same into a 4-way optical splitter 42, as shown. The four optical output signals from each optical splitter 42 are connected via fiber optic cable 206 through a first OMU Unit OMU1 for individual connection to the first four RFN Nodes RFN1-RFN4, as shown. Note that each of the RFN Nodes RFN1-RFN32 are typically connected to multiple band ceiling mounted omnidirectional antennas 53, which, in this example, are those manufactured by PCTEL, Inc., for both transmitting RF signals from the RFN Nodes RFN1-RFN32 to user devices, and for receiving signals therefrom for connection to the RFN Nodes RFN1-RFN32.

When personal communication service users and/or cell phone users wish to send signals from their user devices back to carriers associated with Service Group SG1 in this example, their associated RFN Node (could be any one of RFN1-RFN4, in this example) receives their transmitted RF signals from an associated antenna 53 and converts the signals from electrical signals into optical signals for connection or feeding via fiber optic cables 120, 122, 124, and 126 to an associated OMU Unit shown as OMU1, shown, in this example. Such user generated signals associated with Service Group SG1 are fed via cable 208 from the associated OMU Unit, such as OMU1, to four optical receivers 46, respectively of FTU-RF1. The four optical receivers 46 convert the user optical signals into four electrical signals, respectively, for connection via electrical cable 210 individually to four input lines of a 32-way combiner 28 of SCU1, as shown. Similarly, when the System 200 includes thirty-two RFN Nodes RFN1 through RFN32, then each electrical input of the 32-way combiner 28 will be fed a user signal associated with the RFN's 1-32, respectively, in a similar manner. The output of the 32-way combiner 28 is amplified by an amplifier 30, as shown and fed to a crossband coupler (XBC) 32, as shown. The output signal from amplifier 30 is also tapped off for providing an uplink (UL) monitor signal 17 for maintenance purposes. The XBC has one output for high frequency signals (HF) fed to 6-way splitter 34, and low frequency signals (LF) fed to 2-way splitter 36. For example, the high frequency signal range can be 1,800 MHz to 2,500 MHz, and the low frequency signal range can be 650 MHz to 1,000 MHz. Six low frequency signal output lines from the 6-way splitter 34 are individually connected via electrical able 212 to RIM1 through RIM6 of RIS1, whereas the two high frequency output signals lines from the 2-way splitter 36 are individually connected via an electrical cable 212 to the RIM modules RIM7 and RIM8, respectively of RIS1, as shown. The user signals are then connected from the RIS1 to the associated respective carriers of Service Group SG1, as shown. The RIM1 through RIM6 pass the user generated signals to personal communication service base station sectors PCS-A through PCS-F, respectively. Also, Radio Interface Modules RIM7 and RIM8 pass the user or return cellular signals to sectors Cell-A, and Cell-B, respectively, of Service Group SG1.

Operation of the Service Combiner Units SCU2 and SCU3 (see FIGS. 3 and 4) are substantially the same as previously described above for the Service Combiner Unit SCU1. The only difference is that as previously indicated, the signals associated with those of Service Group SG2, and those of Service Group SG3 are different from one another, and from those of Service Group SG1, otherwise the signal processing is identical to that previously described for signals associated with Service Group SG1. Similar comments and operation apply for FTU-RF1-8, and OMU1-4.

Figure 7:
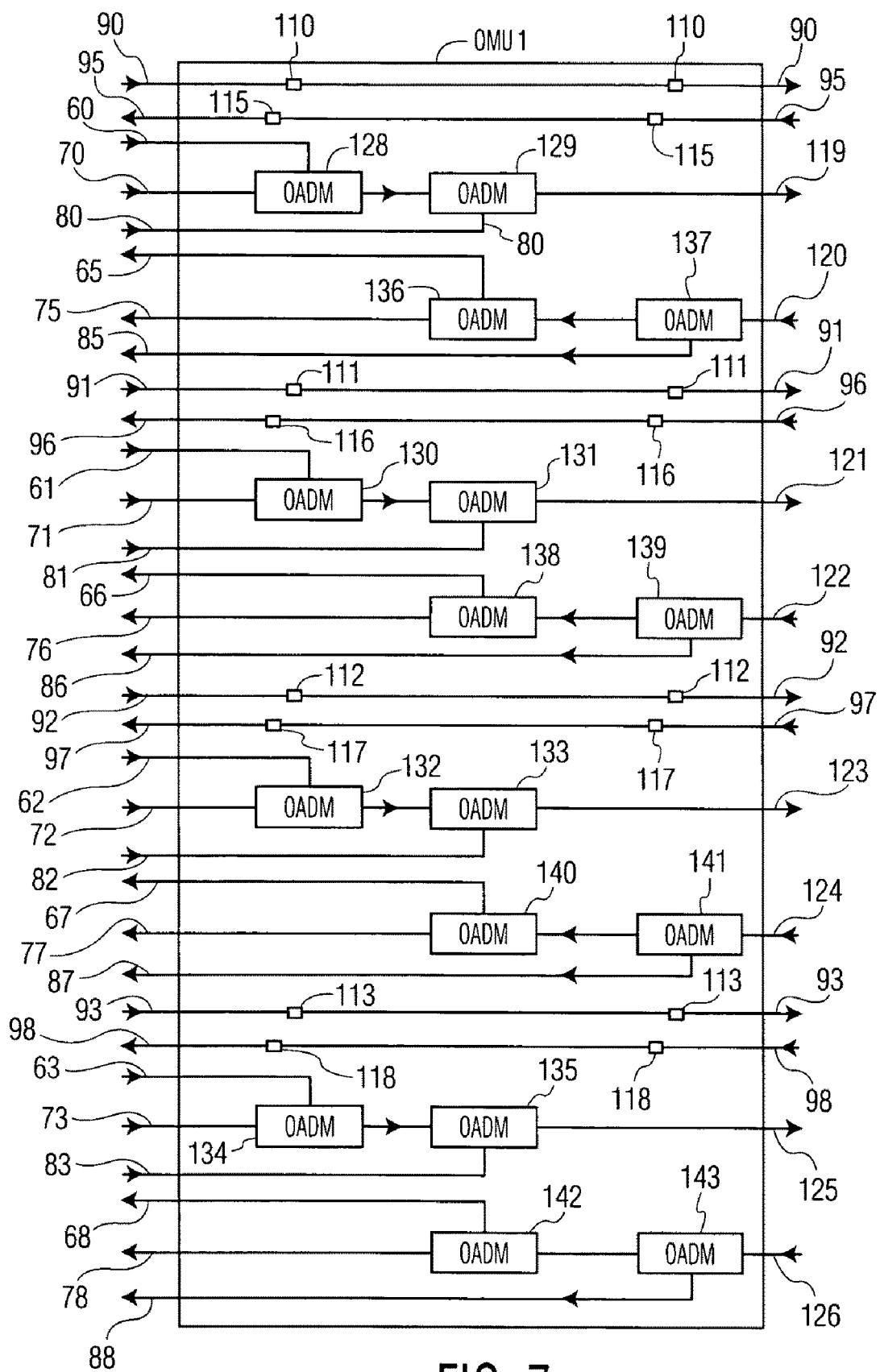

Operation of the Optical Multiplexer Unit OMU1 will now be described in greater detail with reference to both FIGS. 6 and 7. As previously described, the 4-way optical splitter 42 of the Fiber Transceiver Unit FTU-RF1 outputs signals via cable 206 (see FIG. 5) on signal lines 60 through 63, each of which is an optical cable carrying eight optical signals each of different wavelength, representative of signals generated by the personal communication services provided by carriers of Service Group SG1, in this example. The optical signal lines 60 through 63 are connected to optical add/drop networks 100 through 103, respectively (see FIG. 6). Similarly, the 4-way optical splitter 42 associated with signals from the base station sectors of Service Group SG2 outputs the associated now optical signals into fiber optic cables 70 through 73 for connection to the optical add/drop networks 100 through 103, respectively. Similarly, the 4-way optical splitter 42 associated with signals derived from the base station sectors of Service Group SG3 feeds the corresponding eight optical signals into fiber optic cables 80 through 83 for connection to optical add/drop networks 100 through 103, respectively of OMU1. The optical add/drop networks 100 through 103 are configured to multiplex or add together the up to eight optical signals associated with signals generated by Service Groups SG1-SG3, and to feed the multiplexed optical signals over fiber optic cables 119, 121, 123, and 125, respectively, to their associated Radio Frequency Node RFN1 to RFN4, as shown. The RFN Nodes RFN1 to RFN4 may receive user generated RF signals that refer back to a specific base station sector of either one of Service Groups SG1 through SG3, respectively. Note that the RFN Nodes RFN1 to RFN32 each operate to convert the received optical signals into corresponding RF signals for transmission from antennas 53 into an area being served, as previously mentioned. Contrariwise, the user generated RF signals receive by an antenna 53 are fed to an associated RFN Node, which acts to convert these signals into optical signals, as will be described in greater detail below. As shown for the example for four RFN Nodes RFN1 through RFN4, user generated optical signals are fed therefrom via fiber optic cables 120, 122, 124, and 126, respectively, to optical add/drop networks 105 through 108, respectively. The optical add/drop networks 105 through 108 are configured to demultiplex the optical signals received, and output the demultiplexed signals via fiber optic cables 65 through 68 through a cable 208 to individual ones of four optical receivers 46, respectively, shown as Optical Receivers 1 through 4 (in the upper portion of FTU-RF1 of FIG. 5), for converting optical signals from users into RF signals for transfer back to associated base station sectors of Service Group SG1, as previously described. Similarly, optical add/drop networks 105 through 108 demultiplex optical signals from users to be fed back to base station sectors of Service Group SG2 to optical receivers 48, specifically including optical receivers 5 through 8, respectively, of FTU-RF1. Also, the optical add/drop networks 105 through 108 are operative to demultiplex signals from users of RFN Nodes RFN1-RFN4, and feed the signals to optical receivers 50, specifically including optical receivers 9 through 12, respectively of Fiber Transceiver Unit FTU-RF1.

As shown in FIGS. 2 and 6, fiber optic cable output lines 90 through 93 from Ethernet Fiber Transceiver 56 FTU-E1 are passed through OMU1 via use of fiber optic connectors 110 through 113, respectively. Similarly, the user fiber optic signal lines 95 through 98 are passed through OMU1 via fiber optic cable connectors 115 through 118, respectively. With reference to FIG. 7, the OMU1 includes optical add/drop wavelength division multiplexers OADM 128 through OADM 143. The optical add/drop network 100 includes optical add/drop multiplexers OADM 128 and OADM 129. OADM 128 receives optical signals from cables 60 and 70 and adds or multiplexes these signals together, and feeds the multiplex signals to OADM 129 which adds to these signals the optical signal on cable 80, and feeds the three multiplex signals into fiber optic cable 119. Similarly optical add/drop network 101 includes OADM 130 and OADM 131 for adding together or multiplexing the optical signals on optical cables 61, 71, and 81 for feed into optical cable 121. Also, optical add/drop network 102 includes OADM 132 and OADM 133 for adding together or multiplexing the optical signals on optical cables 62, 72, and 82 for feed into optical cable 123. Also, optical add/drop network 103 includes OADM's 134 and 135 for adding together the optical cables on cable 63, 73, and 83, and feeding the multiplexed signals onto fiber optic cable 125. Optical add/drop network 105 includes OADM's 136 and 137 for demultiplexing optical signals from optical cable 120 and feeding the signals into fiber optic cables 65, 75, and 85. Optical add/drop network 106 includes OADM's 138, and 139 for demultiplexing optical signals from fiber optic cable 122, and feeding the demultiplexed signals onto fiber optic cables 66, 76, and 86, respectively. Optical add/drop network 107 includes OADM's 140 and 141 for receiving optical signals from fiber optic cable 124 and demultiplexing the same, for feeding the demultiplexed signals onto fiber optic cables 67, 77, and 87, respectively. Optical add/drop network 108 includes OADM's 142, and 143 for demultiplexing optical signals from fiber optic cable 126, and feeding the three demultiplexed signals onto fiber optic cables 68, 78, and 88.

Note that in the OMU1, for optical signals received from the RFN1 in the OMU1, the sequence of the OADM's 136-143 permit leveling off of the signal magnitudes to substantially insure that the signals from the OMU that are fed back to the FTU-RF1, as shown, have substantially the same magnitude. Also for signals in the OMU1 received from the FTU-RF1, the signals as they pass from the OMU to the RFN's 1-4 are processed in the opposite order of receipt by the OADM's 128-135 to provide the proper amplitude tilting to substantially level off the signals fed through the RFN. This is essentially a FIFO or first in first out approach to level off the magnitudes of the signals either received or transmitted via the OMU1. FTU-E signals are passed through and organized by OMU1 via optical cables 209 (includes optical cables 90-93) and 211 (includes optical cables 95-98), as shown in FIGS. 6 and 7.

Figure 8:
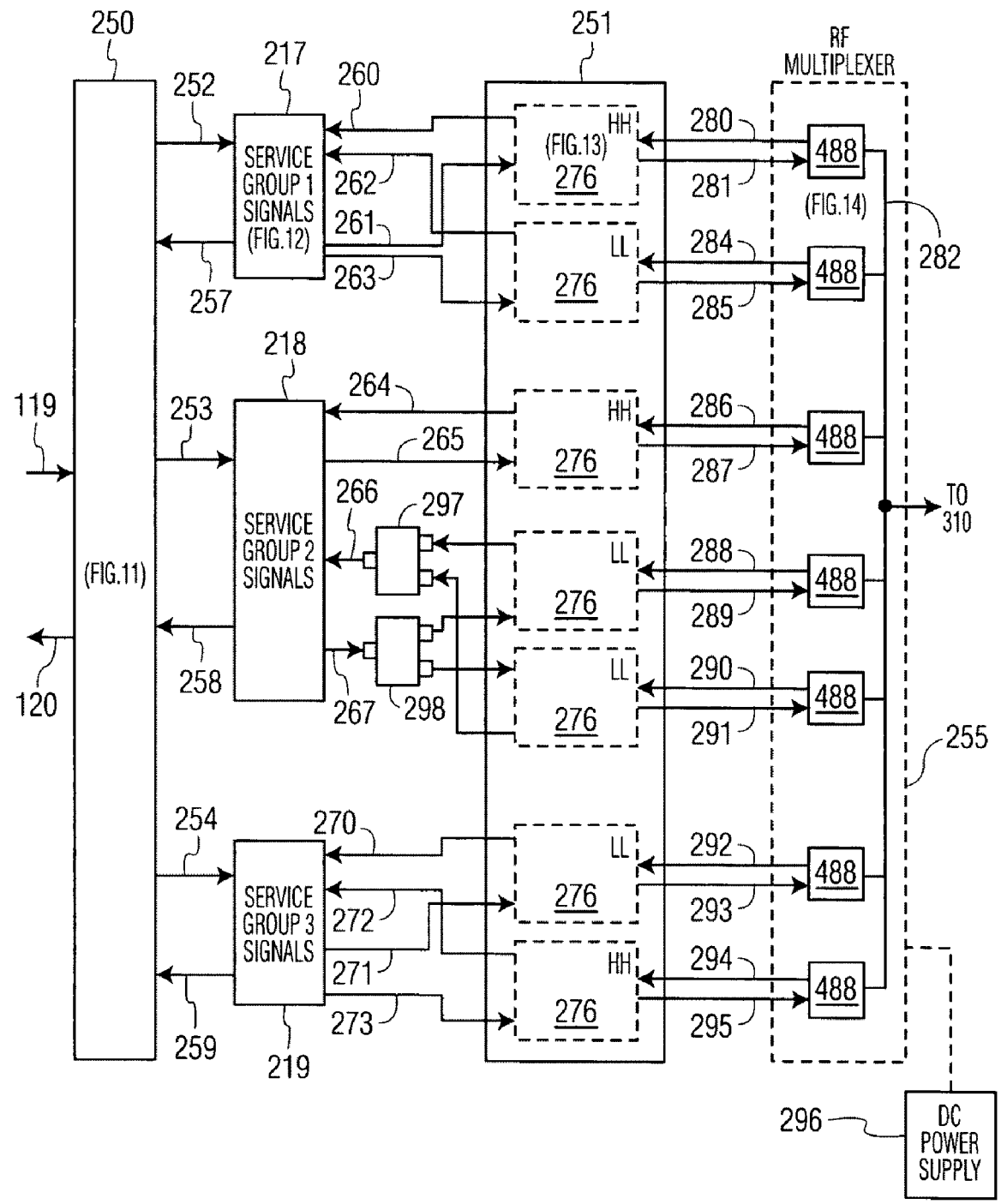
FIGS. 8 and 9 show a simplified block schematic diagram of a Radio Frequency Node (RFN) design for an embodiment of the invention.

With reference to FIGS. 8 through 14, the design of any one of Remote Fiber Nodes RFN1 through 32, in this example, is shown in detail, and will now be described. With particular reference to FIG. 8, showing the design details for RFN1 (the design of RFN2 through RFN32, respectively, are identical), includes an Optical Multiplexer Unit 250. More specifically, as will be described in greater detail below, OMU 250 demultiplexes optical signals received from fiber optic cable 119, and feeds optical signals through fiber optic cable 252 associated with Service Group SG1 to Signal Processor 217, optical signals associated with Service Group SG2 along fiber optic cable 253 to Signal Processor 218, and optical signals associated with Service Group SG3 along fiber optic cable 254 to Signal Processor 219. Uplink optical signals associated with Service Group SG1 are fed from Signal Processor 217 along fiber optic cable 257 to OMU 250. Uplink optical signals associated with users for Service Group SG2 are fed along fiber optic cable 258 from Signal Processor 218 to OMU 250. Uplink optical signals associated with users for Service Group SG3 are fed from Signal Processor 219 via fiber optic cable 259 to OMU 250. The uplink users signals received from fiber optic cable 257, 258, and 259 are multiplexed by OMU 250, and outputted therefrom along fiber optic cable 120. The Service Group SG1 through Service Group SG3 optical signals received by OMU 250 from fiber optic cable 119 are demultiplexed and fed to optical Signal Processors 217, 218, and 219, along fiber optic cables 252, 253, and 254, respectively, as previously explained. The Signal Processors 217, 218, and 219 each are identical in design, the design being shown in detail in FIG. 12 and described below. Signal Processor 217 converts optical signals received from fiber optic cable 252 into radio frequency (RF) signals, feeds the higher frequency signals (HH) via RF cable 261 to a Communication Band Processor 276, which signals are associated with personal communication service signals, that is PCS signals. Lower frequency signals (LL) associated with cellular signals are fed from Signal Processor 217 to another Communication Band Processor 276, as shown. The first Communication Band Processor 276 receives uplink RF signals from duplexer 488 provided on RF cable 280. A Communication Band Processor 276 processes the signals as will be described below, and feeds the processed signals on RF signal line 260 to the SG1 Signal Processor 217. These signals are, in this example, relatively high frequency PCS signals. Lower frequency signals associated with cellular signals for SG1 are fed from the second Communication Band Processor (CBP) 276 along signal line 262 to Signal Processor 217. The Signal Processor 217 converts the RF signals received from signal lines 260 and 262 into optical signals which are outputted into fiber optic cable 257 feed these signals OMU 250. A Communication System Band System 251 that includes seven band specific Communication Band Processors 276, an RF Multiplexer Section that includes seven band specific duplexers 488. A DC power supply 296 provides necessary DC power to the active operating components of the RFN1.

Figure 9:
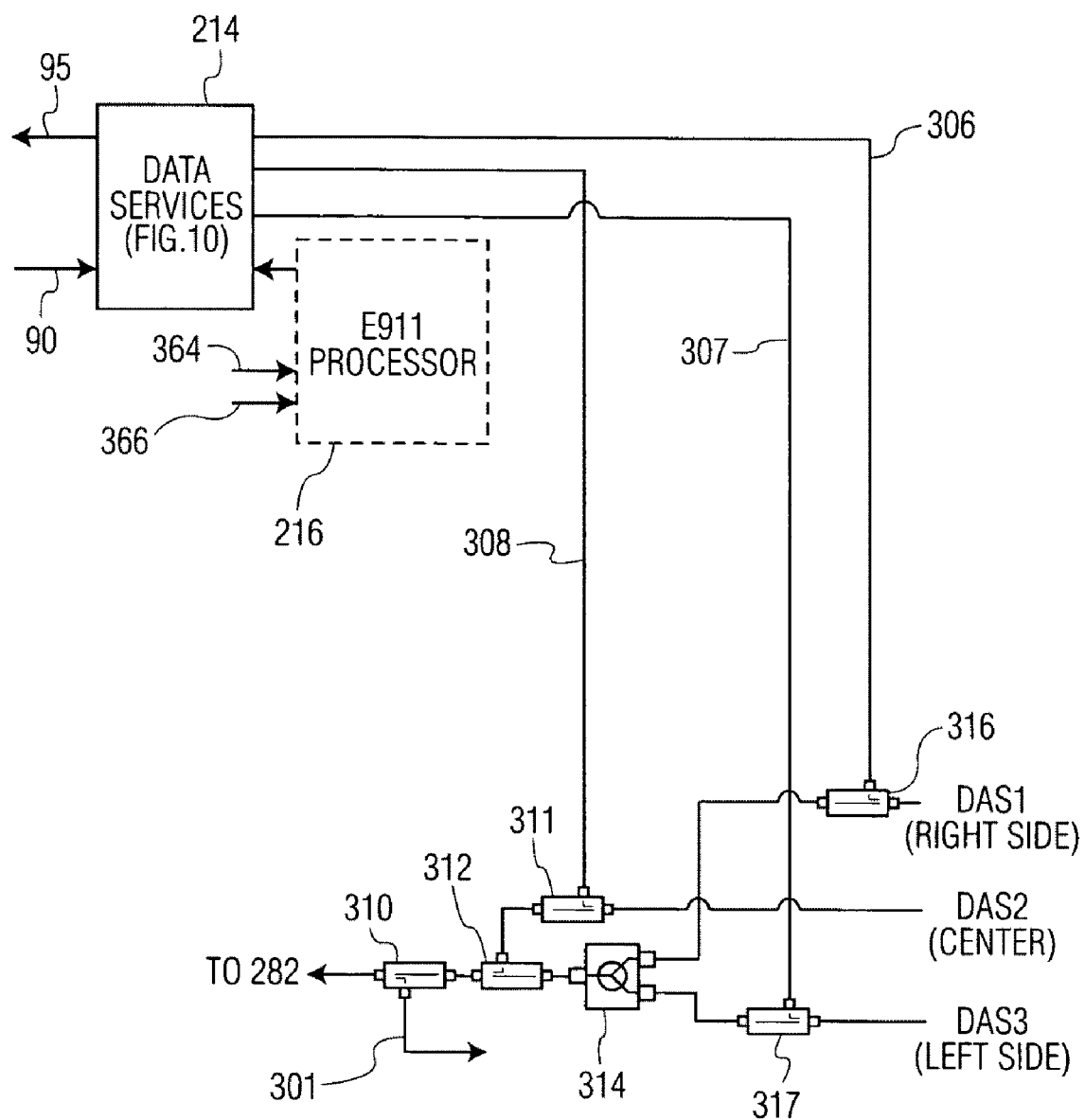
Figure 10:
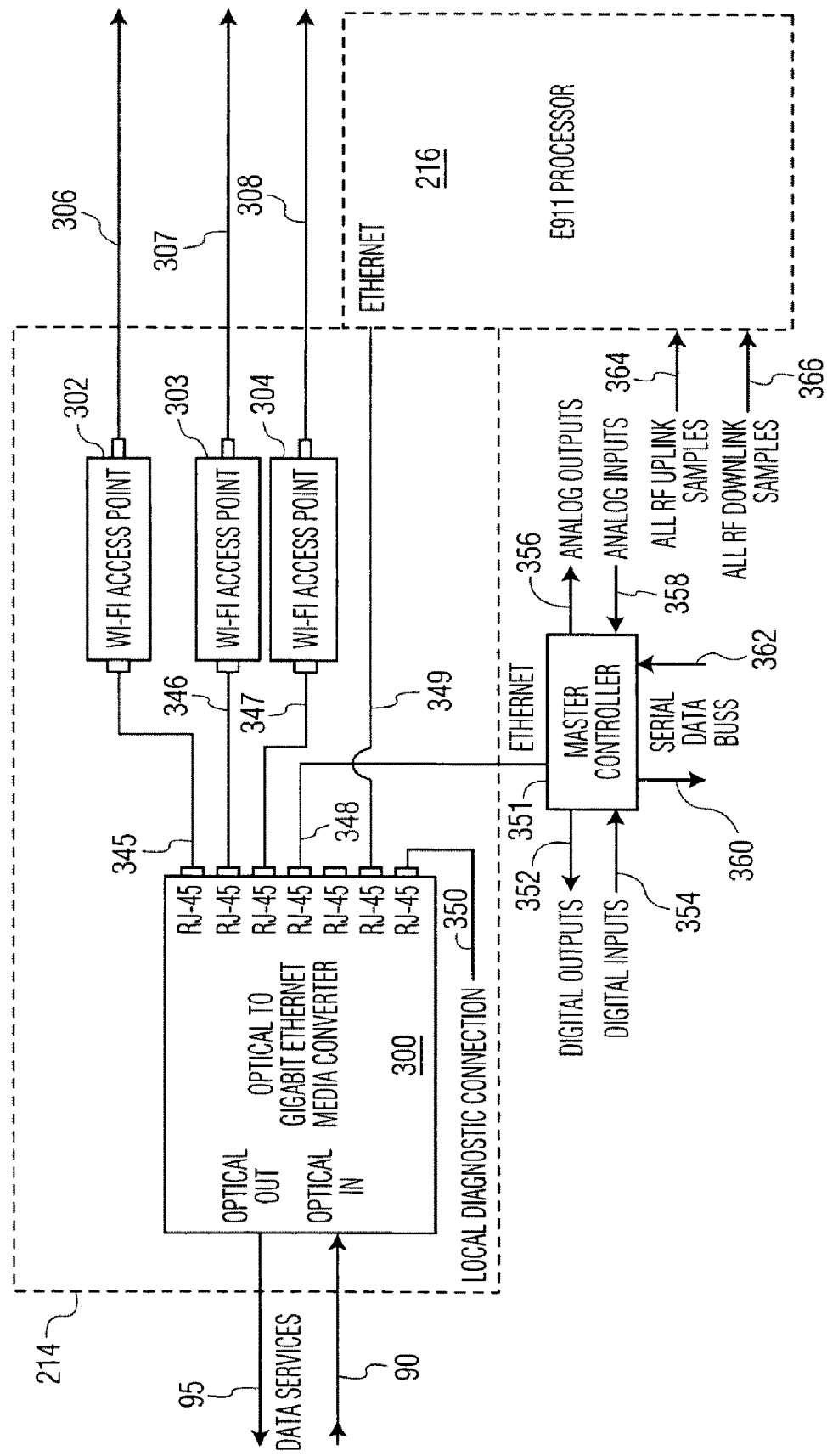
FIGS. 10 through 14 show block schematic diagrams of various submodules and other portions of the RFN of FIG. 8.

The RFN1 further includes as shown in FIG. 9 a Data Services System 214, an E911 Processor 216, five bi-directional couplers 310, 311, 312, 316, and 317, respectively, and a signal coupler/splitter 314. As shown in FIG. 10, a Data Services Subsystem 214 includes an optical to gigabyte Ethernet Media Converter 300, WI-FI access points 302, 303, and 304, respectively. The E911 Processor 216 has its own Internet protocol (IP) address, and functions to convert E911 emergency signals to Ethernet signals which are fed along an Ethernet signal line 349 to an RJ-45 port of media converter 300 for processing. The E911 Processor 216 also receives all RF uplink sample signals via RF signal line 364, and all RF downlink sample signals from RF signal line 366, as shown. Also shown in FIG. 10 is a Master Controller 351 that is included in each RFN, and has its own IP address to identify its associated RFN. Also, the Master Controller 351 provides digital output signals from control via signal line 352, receives digital input signals from signal line 354, provides analog output control signals on signal line 356, receives analog input signals along signal line 358, and transmits serial data output signals along signal line 360, and received serial data input signals along signal line 362, as shown. The Master Controller 351 provides both the control signals and processes monitoring signals for both plug-in and hardwired service area components of the RFN, and connects to Ethernet Media Converter 300 via an Ethernet connection. Each of the RJ-45 ports of the Media Converter 300 are associated with a fixed connection that has an IP address from its associated device. Media Converter 300 receives downlink signals, associated with FTU-E1 via fiber optic cable 90, and provides uplink optical signals via fiber optic cable 95 to its associated FTU-E1. Ethernet signal lines 345, 346, and 347 connect signals from individual RJ-45 ports of Media Converter 300 to WI-FL Access Points 302, 303, and 304, respectively, as shown. The Access Points 302-304 are connected via individual Ethernet Ports to the Media Converter 300, and each has RF output ports for feeding signals along RF cable 306, 307, and 308 to Directional Couplers 316, 317, and 311, respectively (see FIG. 9).

With further reference to FIG. 8, the SG1 signal processor 217 also provides high frequency download signals via RF signal line 261 that are PCS associated signals, to the uppermost CBP 276, and lower frequency signals associated with cellular downlink signals via RF signal line 263 to the second appearing CBP 276, as shown. The uppermost CBP 276 receives uplink signals on RF signal line 280, receives downlink signals along RF signal line 281, in connection with an individual duplexer 488 (the topmost duplexer, in this example). Similarly, the second from the top CBP 276 connected to the second appearing duplexer 488 receives therefrom uplink signals on signal line 284, feeds thereto downlink signals on signal line 285. The Service Group SG2 signal processor 218 is connected for receiving uplink signals via RF signal Line 264 from the third appearing CBP 276, and signal line 266 from a signal combiner 297 that receives uplink signals from individual input ports from the third and fourth appearing CBP 276 plug-in modules. Also, the Service Group SG2 Signal Processor 218 feeds downlink signals from signal line 265 to the third appearing CBP 276, and the along signal line 267 to an input port of a signal combiner/splitter 298 that outputs the downlink signals from individual ports to the third and fourth appearing CBP plug-in modules 276, as shown. The third, fourth, and fifth appearing CBP modules 276 receive uplink signals on signal lines 286, 288, and 290, respectively, from the third through fifth appearing duplexers 488. Also, the third through fifth appearing CBP modules 276 feed downlink signals via the lines 287, 289, and 291, respectively, to the third to fifth appearing duplexers 488, respectively, as shown.

The Service Group SG3 Signal Processor 219 receives optical downlink signals via fiber optic cable 254 from OMU 250, and feeds optical uplink signals via fiber optic cable 259 to the OMU 250, as shown. The Service Group SG3 Signal Processor 219 also receives RF uplink signals via RF signal lines 270, and 272, from the sixth and seventh appearing CBP plug-in modules 276, as shown. Also, the SG3 signal processor 219 feeds downlink optical signals via fiber optic cables 271, 273 to the sixth and seventh appearing CBP plug-in modules 276, respectively, as shown. The third through seventh CBP plug-in modules 276 receive uplink signals from the third through seventh duplexers 488 via RF or electrical signal lines 286, 288, 290, 292, and 294, respectively. The third through seventh appearing CBP plug-in modules 276 feed downlink RF signals via RF cables 289, 291, 293, and 295, respectively, to the third through seventh appearing duplexers 488, respectively. Bidirectional output/input ports of each one of the duplexers 488 are connected in common to an RF signal line 282. Signal line 282 is connected through a port of bidirectional coupler 310 (see FIG. 9).

With further reference to FIG. 9, directional coupler 310 has one port for providing tap off or low power downlink sample on signal sample line 301. Also as shown, directional coupler 310 is connected in series with a directional coupler 312, and signal combiner/splitter 314. Directional coupler 312 has a tap-off port connected to a port of directional coupler 311 for delivering a lower power RF signal to the latter. The output of directional coupler 311 is in this example connected to a DAS (Distributed Antenna System) shown as DAS2, is preferably a multiple band ceiling mount omnidirectional antenna. Such a ceiling mounted antenna is manufactured and sold by PCTEL, Inc. The center antenna DAS2 is connected from a tap-off of directional coupler 312 in order to feed lower power RF signals to a center located antenna, if multiple antennas are used. The individual ports of directional coupler 316 and 317 are individually connected to individual ports of the combiner/splitter 314, as shown. Also, tap ports of directional coupler 316, and 317 are connected to Ethernet signal lines 306 and 307. Tap ports of the directional couplers 316 and 317 are connected to multiband ceiling mount omnidirectional antennas DAS1, and DAS3, which as indicated, are located on the right side and left side, respectively, of the associated RFN1, in this example. Also, that a tap port of directional coupler 311 is connected via RF cable 308 for providing Wi-Fi signals to a Data Services Module 214. Also, Ethernet signals are connected via RF cable 308 to a tap port of directional coupler 311, and via RF cable 307 to a tap port of directional coupler 317, as shown.

Figure 11:
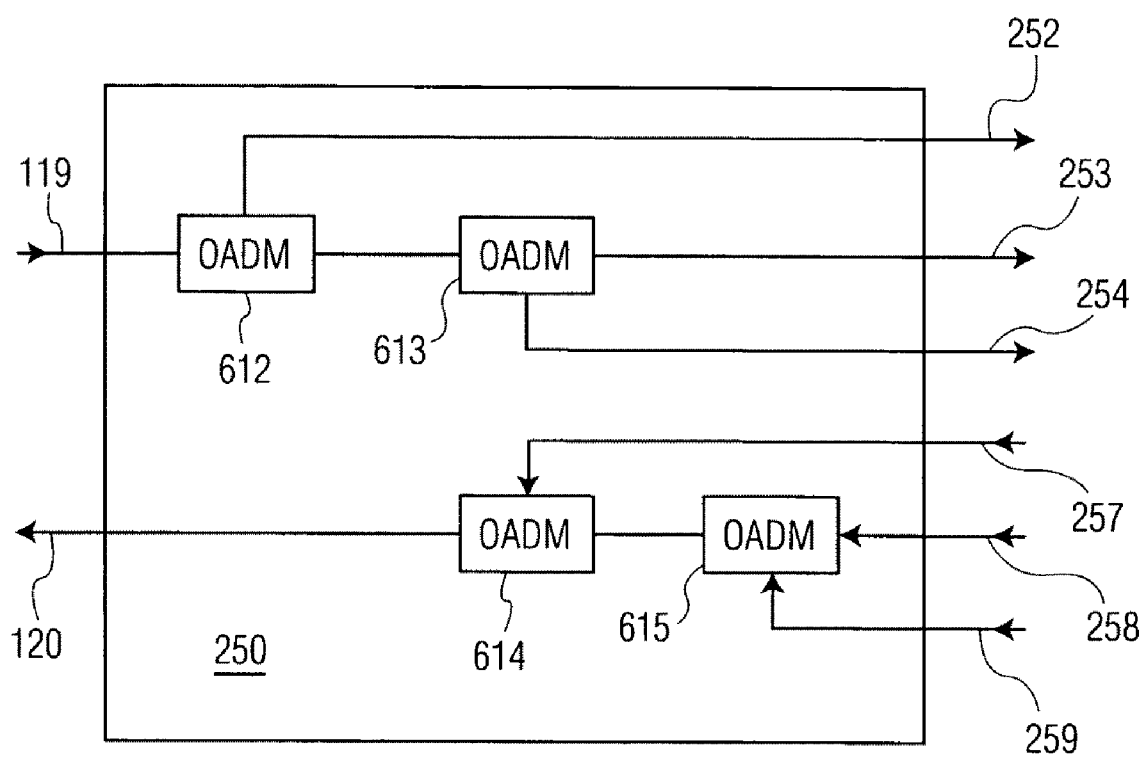

With reference to FIG. 11, the OMU 250 of RFN1, in this example, includes optical add/drop wavelength division multiplexers OADM 612 through 615, as shown. Downlink signals from OMU1 are received on fiber optic cable 119 by OMU 250 for connection to OADM 612. OADM 612 is connected to OADM 613, as shown, whereby these two devices operate to demultiplex the downlinked signals to provide downlink signals associated with SG1, SG2, and SG3, along fiber optic cables 252, 253, and 254, respectively, for connection to Signal Processors 217, 218, 219, respectively, as previously described. OADM 614 receives uplink signals from Signal Processor 217 via fiber optic cable 257. OADM 615 receives uplink signals from Signal Processors 218 and 219, respectively, via fiber optic cables 258, and 259, respectively. OADM 615 combines the signals and connects them to OADM 614 which combines the uplink signals with uplink signals from cable 257, and outputs the combined signals onto uplink fiber optic cable 120, the latter being connected to OADM 137 of OMU1, as previously described. Similarly, OADM devices 614 and 615 provide multiplexing as the uplink optical signals associated with SG1, SG2, and SG3, respectively.

Note that as shown in FIG. 8, the processing of signals as described for Service Group SG1 is substantially identical in the RFN1, except for the processing of the Service Group SG2 signals. The latter requires three Communication Band Processors 276, and three associated duplexes 488, as shown. As previously described, the Service Group SG2 signals are associated with advanced wireless services and 900 MHz service signals. Note, particularly the difference is that one Communication Band Processor 276 is used to feed high frequency AWS uplink signals into RF cable 264, and receive AWS high frequency downlink signals from RF cable 265. Also, Nextel simplified mobile radio (SMR) 800 MHz frequency signals are processed by another Communication Band Processor 276, and a third Communication Band Processor 276 is used to process Nextel SMR 900 MHz lower frequency signals, as shown. The CBP 276 associated with the SMR 800 MHz signals receive downlink signals from a splitter/combiner 298, and feeds uplink signals to a splitter/combiner 297, as shown. The CBP 276 associated with the SMR 900 MHz signals feeds uplink signals to the splitter/combiner 297, and receives downlink signals from the splitter/combiner 298, all as shown. The remaining two CBP Processors 276 process Service Group SG3 signals in the same manner as described for the processing of Service Group SG1 signals. The signals associated with the Service Group SG3 are 700 MHz low frequency signals from UHF channels for possible future video signaling, and these signals are processed by the sixth appearing CBP 276. A last appearing CBP 276 associated with the Service Group SG3 signals processes EBS/BRS high frequency signals.

Figure 12:
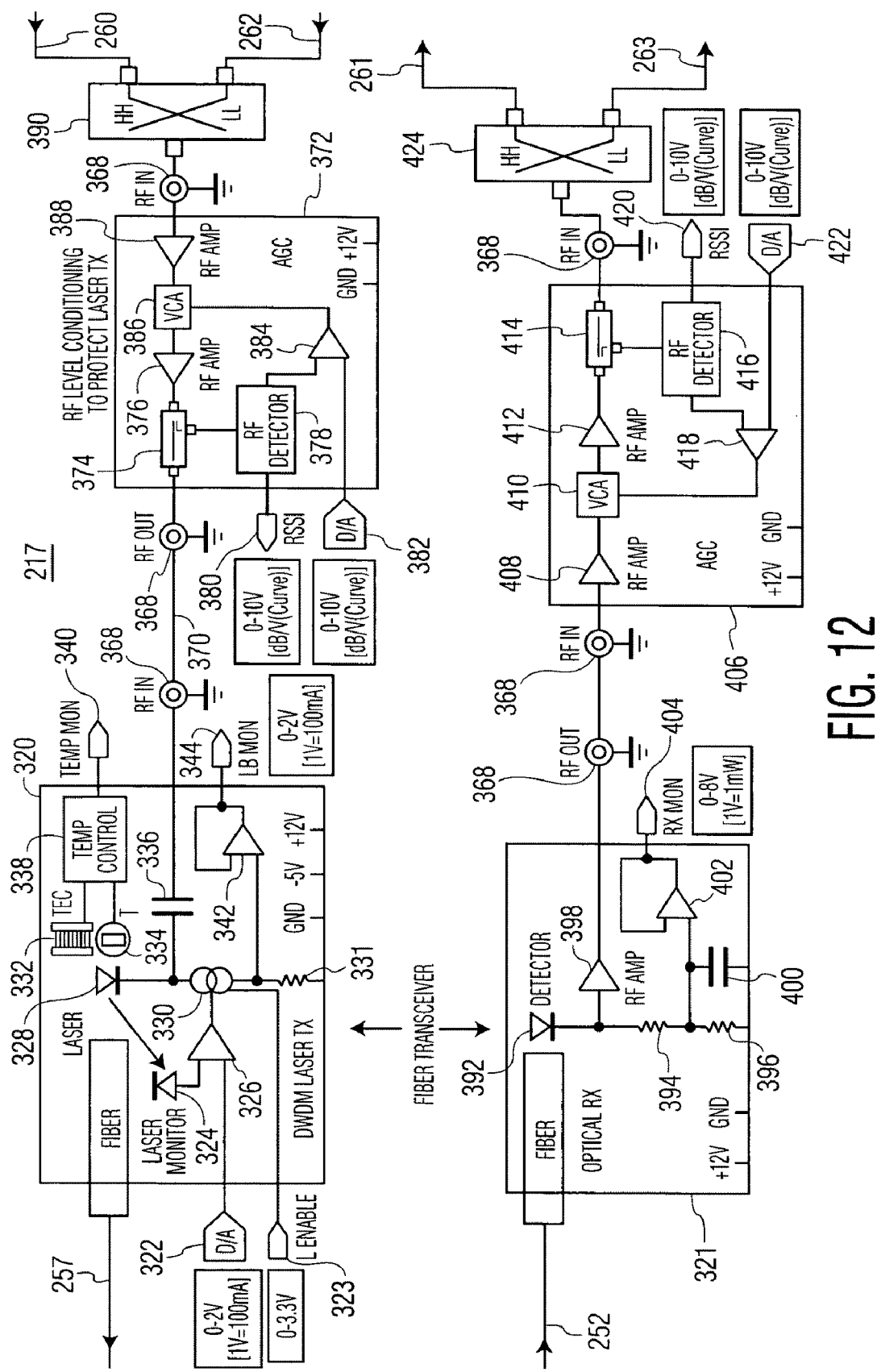

The Service Group SG1 through 3 Signal Processors 217, 218, and 219 all are identical in design. FIG. 12 is a block schematic diagram for Service Group SG1 Signal Processor 217. More specifically, user generated high frequency uplink signals, and low frequency uplink signals from users are received by a crossband coupler 390 via signal lines 260 and 262, respectively. The output of the crossband coupler 390 is connected via an RF cable through an RF coaxial cable connector 368 to the input of an RF amplifier 388 included in an RF level conditioning circuit to protect laser 328. In RF level conditioning 372, the output of amplifier 388 is inputted to a voltage controlled amplifier 386. The RF output of the VCA 386 is controlled via a feedback loop including an RF amplifier 376, a directional coupler 374, and an RF detector 378 having one input of a differential amplifier 384. A level set signal is applied from Master Controller 351 terminal 382 for connection to the other input of the differential amplifier 384. The differential amplifier 384 compares the voltage levels of the output from the RF detector 378 with the control signal at terminal 382, for applying a difference signal therebetween to the VCA 386, for controlling the output voltage therefrom. A connection is also made from the RF detector 378 to an RSSI terminal 380 for providing an RF signal status indication to the Master Controller 351. An output signal from the directional coupler 374 is applied through two RF coaxial cable connectors 368 to a DC blocking capacitor 336 of a portion of a fiber transmitter 320. The other end of the blocking capacitor 336 is connected to the common connection between a current source 330 and the cathode of a laser diode 328. The other end of the current source 330 is connected through a grounding resistor 331. The current source 330 has a connection to a laser enable terminal 323 for receiving a signal for turning off the current source 330, to turn off laser diode 328, to permit maintenance of the fiber transmitter 320 for reasons of safety. Current source 330 is also connected to the output of a differential amplifier 326, which has one input connected to a D/A terminal 322 for receiving a laser bias signal from the Master Controller 351 to set the magnitude of current for the current source 330. The other input of the differential amplifier 326 is connected to the anode of a laser monitor light detector diode 324. The difference in voltage between the voltage developed by the light detecting diode 324 and the laser bias voltage is applied to the current source 330. Laser bias is monitored by Master Controller 351 (see FIG. 10) via voltage buffer 342 of Fiber Transceiver 320 connected to laser bias monitor terminal 344. The fiber transceiver portion 320 further includes a thermistor 334 for sensing the temperature of a laser diode 328, and providing a voltage signal to a temperature controller 338. The temperature controller 338 responds to the temperature signal from thermistor 334 by controlling the voltage applied to a thermoelectric cooler (TEC) 332 for maintaining the temperature of the laser 328 within a safe operating range. The lightbeam outputted by the laser 328 is representative of the uplink RF signals received, and it is applied to an input of a fiber optic cable 257 for connection to an OMU 250, as previously described. Another portion of the fiber transceiver, shown as reference numeral 321, receives downlink optical signals from OMU 250 via fiber optic cable 252, the end of which emits a signal modulated light beam for detection by a light detecting diode 392, which converts the optical signals to electrical signals. Electrical or RF signals are applied to the common connection of the end of an amplifier 398, and to one end of a resistor 394. The other end of the resistor 394 is connected to a grounding resistor 396, as shown. In this example, resistor 394 is 50 ohms, whereas resistor 396 has a value of 1,000 ohms. Resistor 396 provides a small DC voltage drop that is fed to an AC bypass capacitor 400, and to one input of a differential amplifier 402. The differential amplifier 402 is connected as a voltage follower, and has its output connected to an RX MON terminal 404 for providing a DC signal to the Master Controller 351 that is indicative of the receipt of an optical carrier wave via fiber optic cable 252. The common connection between the light detecting diode 392 and resistor 394 is connected to an input of an RF amplifier 398, the latter having an output connected through two RF coaxial cable connectors 368 to the input of an RF amplifier 408 of a Post Signal Level Processor 406. The port of amplifier 408 is connected to an input of voltage controlled amplifier 410. The output of VCA 410 is connected through an RF amplifier 412 to an input of a directional coupler 414, the output of which is connected through a coaxial cable connector 368 to an input port, in this example, of a Crossband Coupler 424. A tap-off port of 414 is connected through an RF detector 416 to one input of the differential amplifier 418, for providing a low voltage signal sample representative of the associated RF signal. A D/A terminal 422 is connected to the other input of the differential amplifier 418 for receiving an analog preset signal from the Master Controller 351 to set the level of the output signal from the VCA 410, whereby the output of a differential amplifier 418 is applied to a control terminal of the VCA 410. High frequency downlink signals are applied from the Crossband Coupler 424 to new line 261, and low frequency downlink signals are applied from the Crossband Coupler 424 to signal line 263. As previously indicated, the Signal Processor described for Service Group SG1 Signal Processor 217 senses signals in the same manner as the Service Group SG2 Signal Processor 218, and Service Group SG3 Signal Processor 219.

Figure 13:
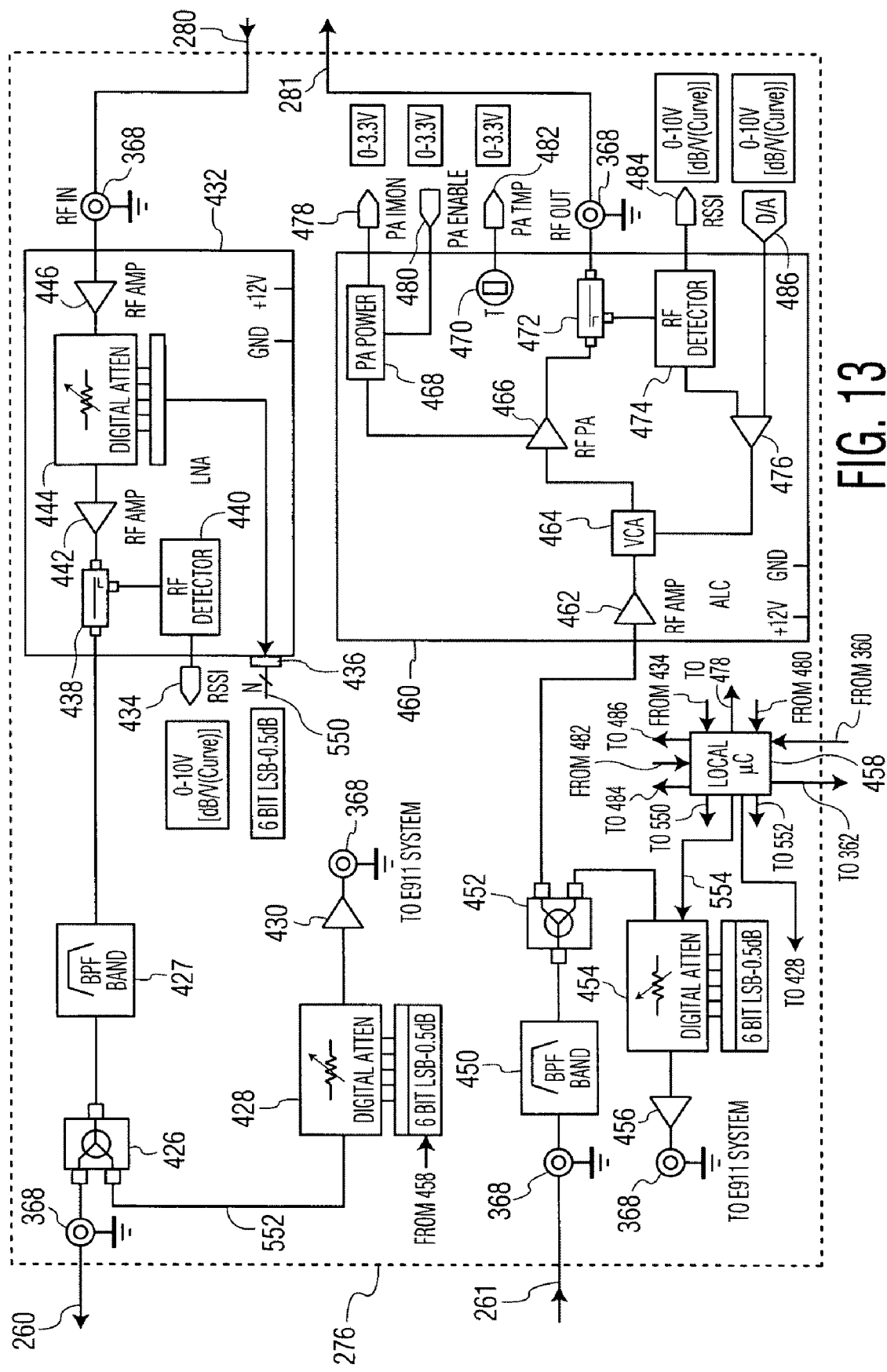

Details for the design of the Communication Band Processors 276 will now be described with reference to FIG. 13. Each of the Communication Band Processors 276 are plug-in modules, the general mechanical features of which will be described in greater detail below. In this example there are no other plug-in modules. Note that the Communication Band Processors 276 each have the same design, as previously mentioned, and the configuration shown in FIG. 13 is in association with Service Group SG1, for purposes of illustration. Also shown, an uplink signal line is connected through a coaxial cable connector 368 to one output port of signal combiner/splitter 426. An RF input port provided by another coaxial cable connector 368 receptive of uplink signals via coaxial cable 280. The uplink input signals are connected from connector 368 to the input of an RF amplifier 446, the output of which is connected to a digital attenuator 444. The digital attenuator 444 is configured at the time of installation of the associated RFN, RFN1 in this example, to control the uplink signal sensitivity level. This signal level is controlled by a local microcontroller 458 that is connected via a control line 550 to a control terminal 436 of uplink signal level processor 432, with the control terminal 436 being wired to the digital attenuator 444, as shown. The uplink signal processor 276 further includes another RF amplifier 442 for amplifying output signals from the digital attenuator 444, and applying the amplified signals to an input of a directional coupler 438. A tap-off port of the directional coupler 438 is connected to an RF detector 440, which comprises a typical integrated circuit that converts the received low level RF signal to a DC output voltage that is connected to a terminal 434 which is connected to the local microcontroller 458. The output of the directional coupler 438 is connected to a bandpass filter 427 for passing frequencies in a range associated with the uplink signal band of interest. The output of the bandpass filter 427 is connected to an input of the signal combiner/splitter 428. Another output of the signal combiner/splitter 428 is connected to a digital attenuator 428, the latter being controlled for maintaining a predetermined signal level at its output that is amplified through an amplifier 430, applied a coaxial cable connector 368 for connection to an E911 System Processor as an uplink sample 364. The digital attenuator 428 is controlled via control line 552 from local microcontroller 458.

With further reference to the Communication Band Processor 276 of FIG. 13, RF signals are received via downlink signal line 261 connected to a coaxial cable connector 368, as shown, for connection to a bandpass filter 450. Bandpass filter 450 is designed to pass frequency bands of interest, and serves to reduce noise outside the bands of interest. Note that signals from the downlink signal line 261 generally contain laser generated noise signals, which are attenuated out of band by the bandpass filter 450. Output of the bandpass filter 450 is connected to an input port, in this example, of a signal combiner/splitter 452 configured as a splitter. One output of splitter 452 is connected to a digital attenuator 454, the output of which is connected through an amplifier 456 to another coaxial cable connector 368 for connection to an E911 System Processor as a downlink sample 366. The digital attenuator 454 is controlled via a control line 554 by the local microcontroller 458. The other output port of the splitter 452 is connected to the input of an RF amplifier 462 included within the automatic level control circuit 460. The output of amplifier 462 is applied to the input of a voltage controlled amplifier 464, the output of which is connected to an RF power amplifier 466, the output of which is connected to the input of a directional coupler 472. The output of the directional coupler 472 is connected via another coaxial cable connector 368 to downlink signal line 281. A power amplifier power control device 468 is included to control the application or removal of power from the power amplifier 466. The power controller 468 is connected via a power amplifier current monitor terminal 478 to the local microcontroller 458. The power controller 468 also includes a control terminal 480 that is connected to the local microcontroller 458, the latter acting to turn off controller 468 if the Communication Band Processor 276 is causing interference in the overall System, or if maintenance is required. A tap-off port of the directional coupler 472 is connected to an RF detector 474, that provides one output signal to a terminal 484 for connection to the local microprocessor 458 for feeding a signal indicative of the level of the downlink output signal being fed to downlink signal line 281. Another output of the RF detector 474 is connected to one input of a differential amplifier 476, the other input of which is connected to a terminal 486 for connection to the local microcontroller 458, for receiving a signal therefrom for controlling the level of the RF output signals applied to the downlink signal line 281. The output of differential amplifier 476 is applied to the control terminal of the voltage controlled amplifier 464 for maintaining the output of the latter at a desired level. The combination of the voltage controlled amplifier 464, power amplifier 466, directional coupler 472, RF detector 474, and differential amplifier 476 all form part of an automatic level control circuit. The local microcontroller 458 feeds monitoring signals to the Master Controller 351 via signal line 362, and receives controlled signals from the Master Controller 351 via signal line 360, as shown. The PA temperature is monitored via thermistor 470 which connects to local microprocessor 458 via 482 PA temperature terminal 482.

Figure 14:
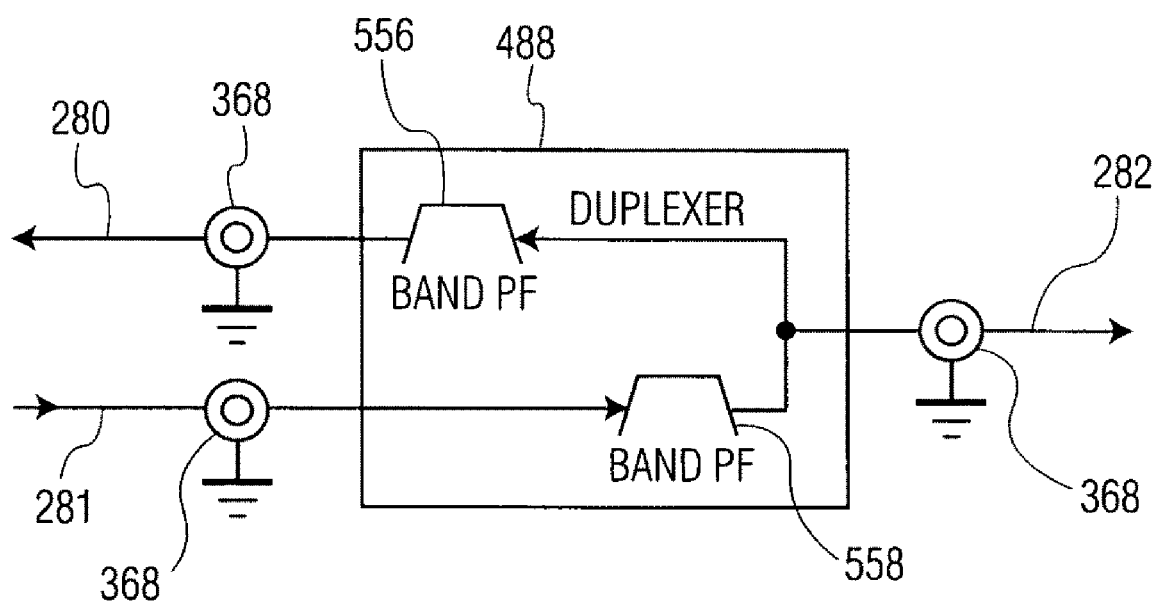

As previously explained, the RF Multiplexer 255, in this example, includes seven band specific duplexer devices 488, whereby such devices are well known in the art. The present illustration is in association with signals associated with Service Group SG1 signals. In FIG. 14 the typical configuration of duplexer 488 is illustrated. As shown, for uplink signals received from users via coaxial signal line 282 connected to a coaxial cable connector 368, a duplexer 488 passes these uplink signals through a bandpass filter 556 for passing frequencies of interest, the output of the uplink bandpass filter 556 being connected to another coaxial cable connector 368 for connection to coaxial cable signal line 280. Downlink signals are received via another coaxial cable connector 368 and connected to the input of another bandpass filter 558 for passing frequencies of interest for connection via coaxial cable connector 368 to antenna signal line 281, as shown.

Figure 15:
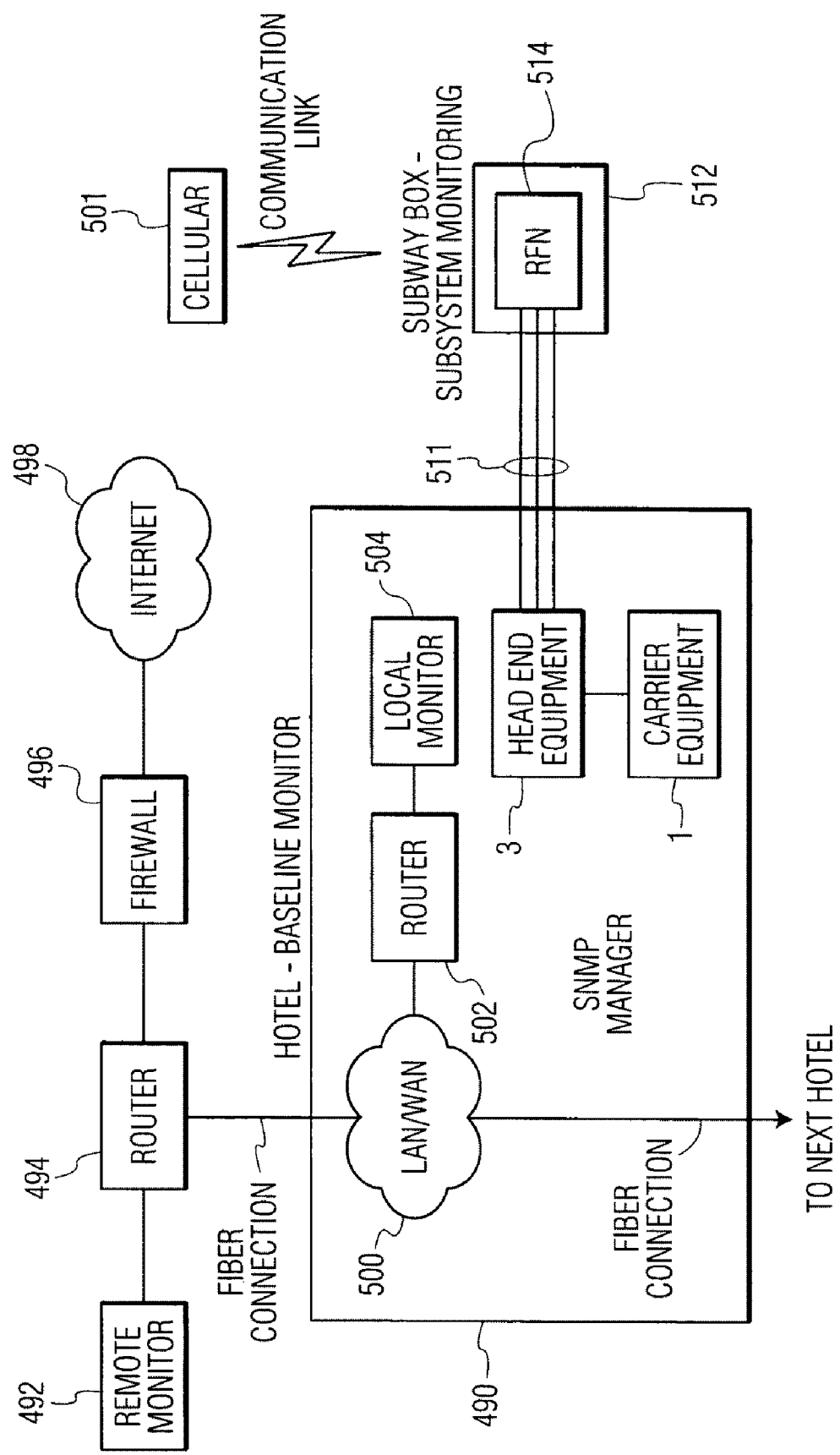
FIG. 15 shows a block and pictorial schematic diagram for one example of the use of the present System for an embodiment of the invention.

In FIG. 15, a simplified block diagram is shown for an example of the installation of the present System. An RF isolated area, such as the subway platform, for example, the subsystem includes an RFN 514. A fiber optic cable 511 is connected from the RFN 514 to a central station or hotel 490. The hotel 490 includes the previously described head end equipment 3, and carrier equipment 1. The hotel 490 provides all SNMP manager functions, and can further include local monitor 504 that is connected through a router 502 through a Local Area Network/Wide Area Network (LAN/WAN) 500, the latter of which interconnects hotel 490 to another hotel or other hotels in the network or system. The LAN/WAN 500 also provides for connection to router 494 which can serve to connect through a firewall 496 to an Internet connection 498, and/or to a remote monitor 492, also a remote monitoring of the overall system. All of the hotels 490 in the overall system are connected or networked together to permit a network operations center to monitor the entire network system at a safe location. For example, if the present system is used in a subway system, or other facilities requiring they be designed to be safe from attack, the network operations center (not shown) can be located in a bombproof secret location secured from attack to the extent necessary.

Figure 16:
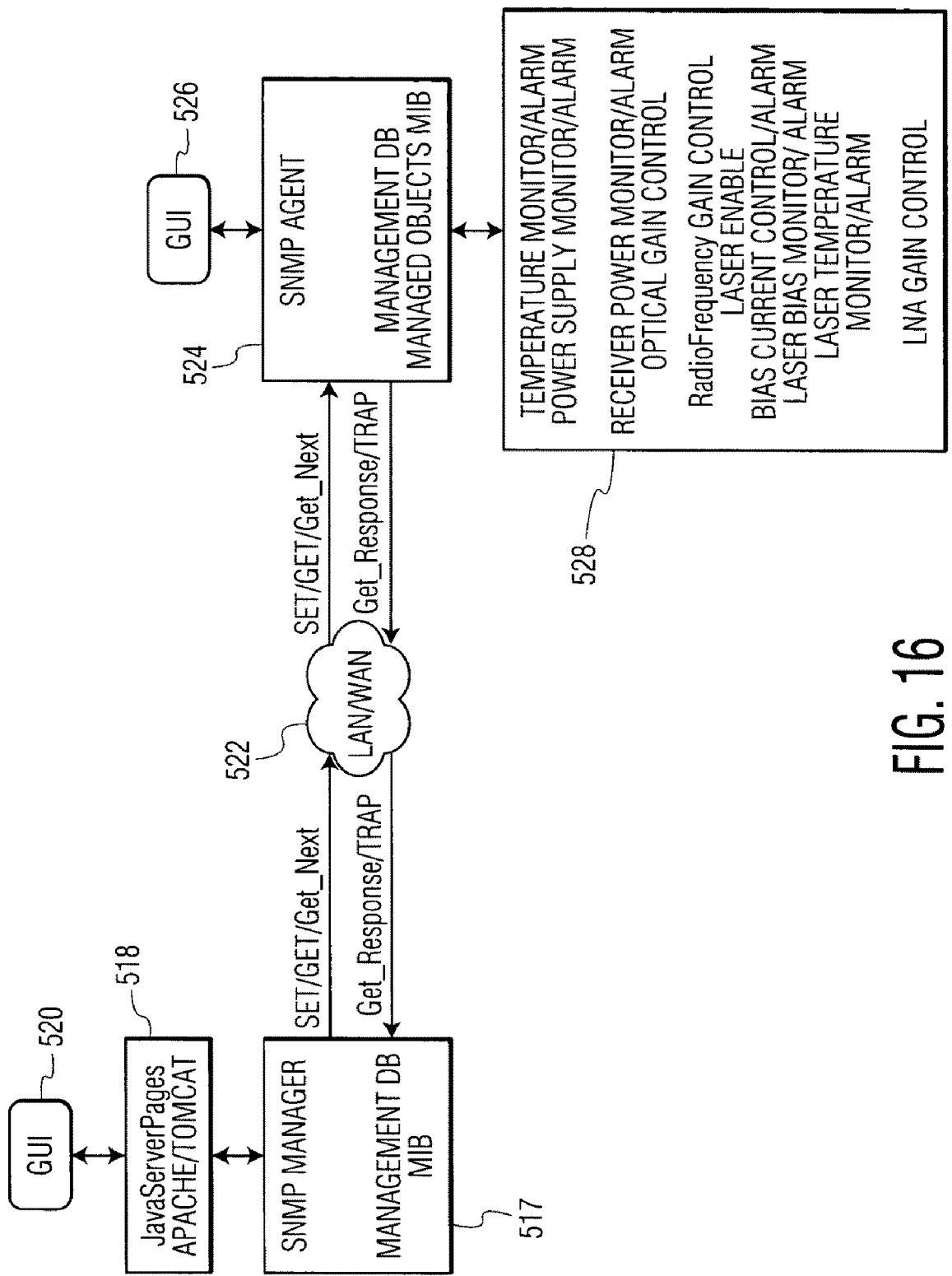
FIG. 16 shows a block diagram at the software level for providing management of the present System for one embodiment of the invention.

FIG. 16, a simplified block diagram at the software level is shown of the present system. A graphic user interface 520, that can be utilized by a third party, is connected via Java server pages such as Apache/Tomcat programming 518 to an SNMP Manager 517. The latter can be programmed using management DB MIB. The software is configured to provide Set/Get/Get Next through a Lan/Wan connection 522, via the Ethernet, to an SNMP Agent 524, bidirectionally connected to a Fiber-Span Provider GUI 526, and bidirectionally to receive and provide digitized monitor/control signals 528, associated as shown with temperature monitor/alarming, power supply monitor/alarming, receiver power monitor/alarming, optical gain control, radio frequency gain control, laser enable control, bias current control/alarming, laser bias monitor/alarming, laser temperature monitor/alarming, and LNA Gain control, as previously described.

Figure 17:
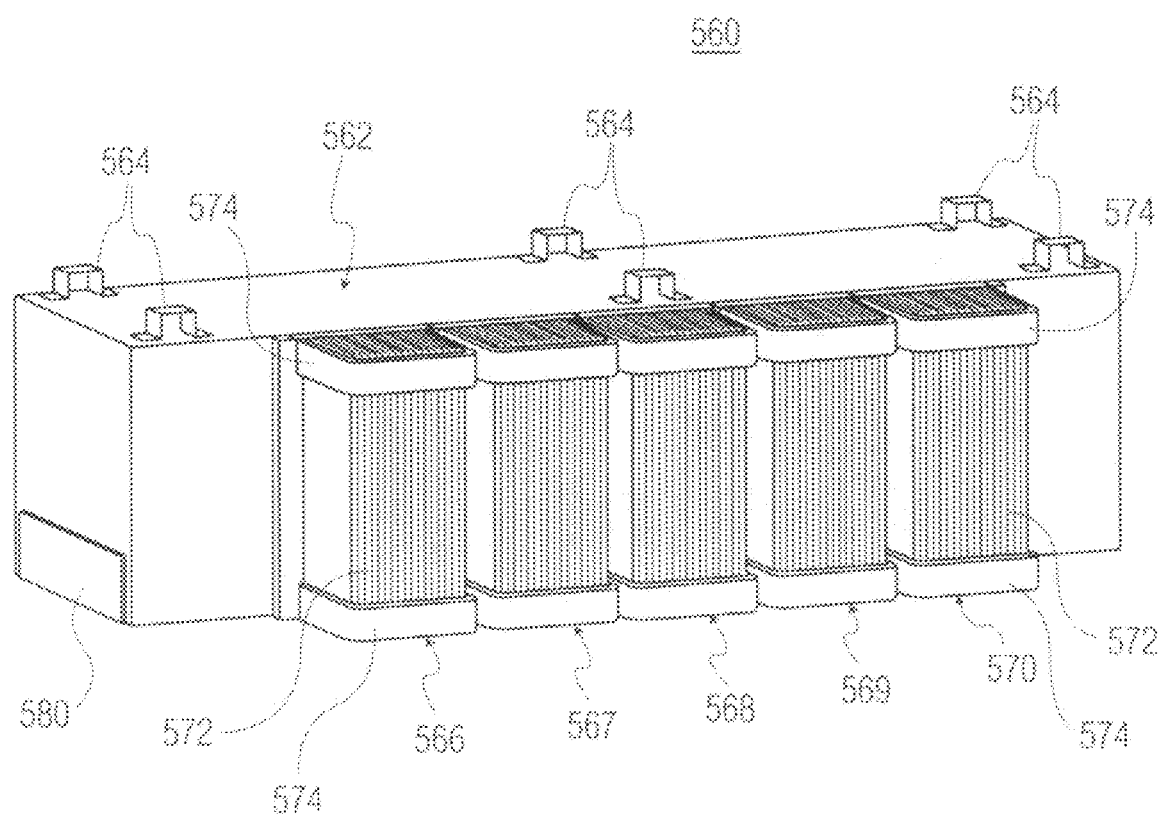
FIG. 17 shows a pictorial view of the exterior mechanical design for an RFN, for one embodiment of the invention.
Figure 18:
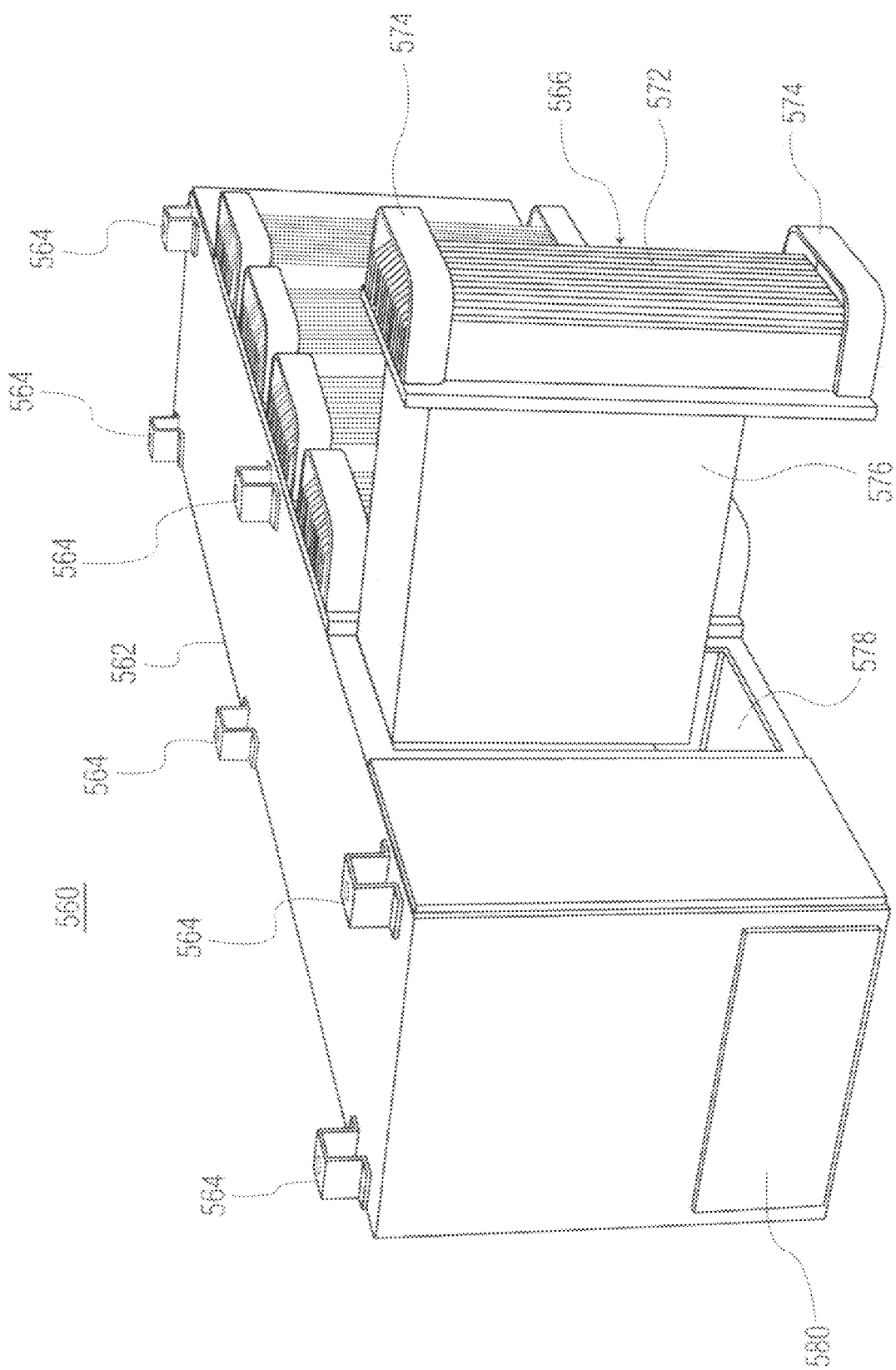
FIG. 18 shows a pictorial view of a plug-in module partially installed into an RFN housing for an embodiment of the invention.

The mechanical configuration for an RFN of the present invention can be provided in many different mechanical configurations. In FIG. 17, the preferred embodiment of the present invention, a pictorial view of the exterior design of an RFN 560 is shown. The housing 562 includes brackets 564 on its top portion for hanging the RFN 560 from a ceiling, for example. Other attachment means can be provided for hanging the RFN 560 from a pole or upright stand. The Communication Band Processors 276 are provided by five plug-in modules 566 through 570. Space is provided for two additional plug-in modules at either end for a total of seven. The exterior faces of each of the plug-in modules 566-570 include a heatsink 572, and each further includes handhold brackets 574 at the topmost and bottommost portions extending outward from the heat shields 572, as shown (also see FIG. 18). Plug-in module 566, and 567 each include a Communication Band Processor 276 for Service Group SG1 signals. Plug-in module 568 includes three Communication Band Processors 276 for Service Group SG2 signals. Plug-in modules 569 and 570 each include a Communication Band Processor 276 for Service Group SG3 signals. As further shown in FIG. 18, the plug-in module 566 partially installed into the housing 562, associated Communication Band Processor 276 is enclosed within sub-housing 576, the latter being shorter than the height of the housing 562 to provide a lowermost open cavity 578 or volume for permitting the installation of other components of the system in the lower portion of the housing 562. Cavity 578 is the service area where optical, RF, and power connections are made via hinged access panels. Each side of the housing includes an access panel 580, such as shown on the left side of housing 562 in FIG. 18. Also, a coaxial cable connector 368 (not shown) is provided for connection to a coaxial cable for connecting the RFN to the directional coupler 310 (see FIG. 9) for connection to the previously described antenna system. Fiber optic cable connectors (not shown) are also provided on the housing 562 for connection to fiber optic cables 119 and 120 (see FIG. 8). The RFN is capable of NEMA 4X or 1P67 environmental ratings.

Note that for use in subway stations, such as the New York City Subway System, a typical subway station will have up to two RFN's 560. One RFN 560 services a targeted area such as a subway platform, a mezzanine, interconnecting tunnels, and so forth. Each RFN 560 has a coaxial cable output to at least one antenna 53, typically known as a DAS or Distributed Antenna System, as known in the art. In the contemplated subway System, a subway station "hotel" 490 is an area where all of the communications systems of the present System 200 are typically located, and fiber optic cabling is used to interconnect to RFN's 560 in various subway stations in a fan out. Only the RFN's are located outside of the associated hotel 490, whereby other portions of the present System can be located in a hotel 490, or another remote location, such as a safe room, for example. Note that for servicing the some two-hundred-seventy-six subway stations in New York City, for example, it is believed that six to ten hotels 490 would be required, whereby each hotel 490 would service a predetermined plurality of subway stations via fiber optic cable linkage to the RFN's 560.

Note that aforesaid discussion of signal transmission and reception for the personal communication service and cell phone carriers is substantially identical for the advanced wire service carriers such as Nextel, and the third grouping for data services and future FCC designated services.

The present System 200 further includes at each hotel 490 an FTU-E (Fiber Transmitter Unit-Ethernet). Each RFN 560 will have Ethernet capability built into it. This permits a service technician to take a PC or personal computer and plug it into an RFN 560 for connection to the associated Ethernet System for diagnosing the RFN 560, adjusting various parameters, and so forth, whereby the technician through the Ethernet can communicate all the way back to the hotel 490 equipment if necessary, or directly service each RFN 560. Also, through use of the Ethernet System, wideband communication with remote locations is provided for managing the entire System 200, in this example, the entire subway communication system. In this manner, a remote controller would be able to control the System 200 being utilized for all New York subway stations, for example. Note that the System may include up to eight FTU-Gigabit E Units for FTU-E1 through FTU-E8, respectively, as shown in FIG. 2. Each FTU-Gigabit E will include four media converters, which are "off-the-shelf devices," with each device including an Ethernet-to-optical transmitter, and an Ethernet-to-optical receiver, whereby each FTU-E includes four such devices, with eight such FTU-Gigabit E's being required to then service RFN1 through RFN32. Accordingly each FTU-Gigabit E is servicing four RFN's. The Ethernet connections permit remote debugging and monitoring of the System 200, which can be remote from the various hotels themselves. The remote control System would likely be in a high security facility. Technicians can use current VoIP technology for communicating during installation and maintenance of System 200.

Many of the components used in the present System are readily available "off-the-shelf." However, for the sake of completeness, a partial parts list is provided below in Table 1 that includes sources for obtaining a number of the components not known to be "off-the-shelf."

TABLE 1

PARTS LIST

| Reference Description | Part No. | Manufacturer/Source |
|---|---|---|
| Fiber Transceiver Unit, Ethernet FTU-E | FS40ED-C-P6 | Fiber-Span LLC |
| Fiber Transceiver RF FTU-RF1-7 | FS40FD-C-P34C | Fiber-Span LLC |
| Radio Fiber Node RFN 560 | FS47R-DL | Fiber-Span LLC |
| Service Combiner Unit SCU1-SCU3 | FS40S-8x6H2L-8x32 | Fiber-Span LLC |
| Radio Interface System RIS1-RIS3 | FS40i-C-P2 | Fiber-Span LLC |
| Optical Multiplex Unit OMU | FS40-OMU-8x2-6x2 | Fiber-Span LLC |

Although various embodiments of the invention have been shown and described, they are not meant to be limiting. Those of skill in the art may recognize certain changes or modifications to these embodiments, which changes or modifications are meant to be covered by the spirit and scope of the appended claims.

What is claimed is:

1. A System for providing cell phone and Internet bidirectional communication for users in RF isolated areas, said System comprising:
   at least one Service Provider for services including cell phones, commercial telecommunications, data, and advanced wireless;
   a plurality of Radio Interface Modules (RIM) for receiving a plurality of downlink Radio Frequency (RF) signals, respectively, from said at least one Service Provider for maintaining the signals at operable levels;
   at least one Service Combiner Unit (SCU) including means for combining and amplifying signals from said plurality of RIM modules;
   at least one Fiber Transceiver Unit (FTU) for receiving and converting said amplified combined signals from RF signals into optical signals;
   at least one Radio Fiber Node (RFN) responsive to said optical signals from said FTU, for converting the signals into RF signals;

at least one antenna for receiving RF signals from said at least one RFN, for transmitting the RF signals into the respective RF isolated area being serviced by said at least one RFN;

wherein said means for combining and amplifying at least one SCU includes:
- a signal combiner for combining the plurality of signals from said plurality of RIM modules; and
- an amplifier for receiving and amplifying the combined signals from said signal combiner;

wherein said at least one FTU includes:
- a dense wavelength division multiplexer (DWDM) laser receptive of said amplified combined signals, for converting these signals from RF signals into optical signals, respectively;

wherein said at least one RFN includes:
- a fiber transceiver including a means for receiving optical signals from said at least one FTU and converting the signals into RF signals;
- a post processor for both amplifying and maintaining a desired signal level for RF signals from said converting means;
- a first bandpass filter for receiving RF signals from said post processor for passing a frequency band of interest, and reducing the noise content in the RF signals, including substantially reducing laser generated noise;
- an automatic level controller for receiving RF signals from said bandpass filter, and including means for both power amplifying the bandpassed signals, while maintaining a desired power level for the power amplified RF signals;
- a duplexer including a second bandpass filter, and means for receiving the downlink power amplified RF signals, and passing them through said second bandpass filter; and
- an antenna distribution network for receiving the RF signals from said second bandpass filter for connection to at least one antenna; and wherein said antenna distribution network includes:
- a first directional coupler having a first port for receiving the RF signals from said second bandpass filter, a second port for providing a relatively low power sample signal, and a third port for outputting a relatively high power portion of received RF signals;
- a second directional coupler having a first port for receiving RF signals from said third port of said first directional coupler, a second port for outputting a relatively low power portion of the RF signals, and a third port for outputting a relatively high power portion of the RF signals;
- a third directional coupler having a first port for receiving RF signals from the second port of said second directional coupler, a second port bidirectionally coupling to Wi-Fi signals, and a third port for feeding and receiving a the RF and Wi-Fi signals to and from a centrally located first antenna relative to the position of said RFN;
- a splitter/combiner having a first port for connection to and receiving RF signals from the third port of said second directional coupler, and second and third ports for outputting split portions of the received RF signals, respectively;
- a fourth directional coupler having a first port connected to receive RF signals from the second port of said splitter/combiner, a second port for bidirectionally coupling to Wi-Fi signals, and a third port for feeding and receiving RF signals and Wi-Fi signals to and from a second antenna located relative to a right side of said RFN Node; and
- a fifth directional coupler having a first port connected to receive RF signals from the third port of said splitter/combiner, a second port for bidirectionally coupling to Wi-Fi signals, and a third port for feeding and receiving RF signals and Wi-Fi to and from a third antenna located relative to a left side of said RFN Node.

2. The system of claim 1, further including an Ethernet/LAN subsystem connected to said second ports of said third through fifth directional couplers, respectively, for Wi-Fi services.

3. The system of claim 1, wherein said at least one RFN further includes:
- said duplexer further including a third bandpass filter for receiving user device generated uplink RF signals associated with said at least one service provider;
- an uplink signal processor for receiving filtered uplink RF signals from said duplexer, said processor including:
  - an RF amplifier for amplifying the RF signals;
  - a digital attenuator for receiving and attenuating the amplified RF signals to control the uplink signal sensitivity of said system;
  - another RF amplifier for receiving and amplifying the attenuated uplink RF signals;
  - a sixth directional coupler having a first port for receiving the amplified and attenuated uplink RF signals, a second port for tapping off a relatively small portion of the signals to provide a monitoring signal to said local microcontroller, and a third port for outputting a relatively large portion of said uplink RF signals;
  - a fourth bandpass filter for receiving and filtering the uplink RF signals from said sixth directional coupler;
  - a combiner/splitter having a first port for receiving the uplink RF signals from said fourth bandpass filter, and splitting the signals for outputting at second and third ports thereof, respectively;
  - an RF level conditioning circuit for receiving uplink RF signals from the second port of said combiner/splitter, for providing E911 uplink RF signals; and
- said Fiber Transceiver further including means for converting said level controlled uplink RF signals into uplink optical signals.

4. The system of claim 3, further including:
- said FTU including at least one optical receiver for receiving said uplink optical signals from said at least one RFN, and converting these signals back into uplink RF signals;
- said at least one SCU Unit being receptive of said uplink RF signals, and including splitter means for splitting these RF signals for individual connection to said plurality of RIM modules, respectively; and
- said RIM modules adjusting the level of individually received uplink RF signals for connection to said at least one Service Provider.

5. A System for providing cell phone and Internet bidirectional communication for users in RF isolated areas, said System comprising:
- a plurality of Service Providers (SP) for services including cell phones, commercial telecommunications, data, and advance wireless;
- a plurality of Radio Interface Modules (RIM) for receiving Radio Frequency (RF) signals from said plurality of Service Providers (SP), respectively, for maintaining the signals at operable levels;

a plurality of Service Combiner Units (SCU) each including means for receiving signals from said plurality of RIM's and amplifying respective groups of the signals;

a plurality of Fiber Transceiver Units (FTU) for receiving and converting said amplified signal groups from RF signals into optical signals;

a plurality of Optical Multiplexer Units (OMU) for receiving said plurality of optical signals from said plurality of FTU Units, and multiplexing the signals into a plurality of multiplexed groups of said signals, each multiplexed group including optical signals corresponding to RF signals from each of said plurality of Service Providers, respectively;

a plurality of Remote Fiber Nodes (RFN) each responsive to a plurality of said multiplexed groups of said optical signals, for converting the signals into RF signals;

a plurality of antennas connected to said plurality of RFN Nodes, for receiving RF signals therefrom, respectively, for transmitting the RF signals into RF isolated areas being serviced by said plurality of RFN's, respectively;

wherein said plurality of Service Providers include:
- a first group (SG1) of said providers for providing a plurality of personal communication services (PCS), and cellular sectors, respectively;
- a second group (SG2) of said providers for providing a plurality of advanced wireless services (AWS), and 900 MHz sectors, respectively; and
- a third group (SG3) of said providers for providing a plurality of 700 MHz, 800 MHz, and Data Service sectors, respectively;

wherein said plurality of RIM modules include first, second, and third groups thereof for level maintaining RF signals from said first, second, and third groups (SG1-SG3) of said providers, respectively; and wherein said plurality of SCU Units includes:
- a first SCU Unit including:
  - a signal combiner for receiving and combining SG1 RF signals from said first group of RIM's; and
  - a first amplifier for amplifying the combined SG1 RF signals;
- a second group of SCU's including:
  - a signal combiner for receiving and combining SG2 RF signals from said second group of RIM's; and
  - a second amplifier for amplifying the combined SG2 RF signals; and
- a third group of SCU's including:
  - a signal combiner for receiving and combining SG3 RF signals from said third group of RIM's; and
  - a third amplifier for amplifying the combined SG3 RF signals.

6. The System of claim 5, wherein said plurality of FTU's include:
a first FTU-RF including:
first through third means for receiving and converting the combined and amplified SG1 through SG3 RF signals into SG1 through SG3 optical signals, respectively; and
first through third optical splitters for splitting the SG1 through SG3 optical signals, respectively, each into a predetermined number of SG1 through SG3 optical output signals equal in number to a number of RFN Nodes selected for servicing by said first FTU-RF.

7. The System of claim 6, wherein said plurality of OMU's include:
a first OMU including:
a first plurality of optical add/drop wavelength division multiplexers (OADM) configured for receiving and multiplexing the SG1 through SG3 optical output signals together for insertion into each one of said number of RFN Nodes selected for servicing by said first FTU-RF, respectively.

8. The System of claim 7, wherein said plurality of RFN Nodes each include:
an OMU Unit including a plurality of OADM multiplexers configured for demultiplexing said SG1, SG2, and SG3 optical signals into separate individual optical signals, respectively;
SG1, SG2, and SG3 signal processors each including a Fiber Transceiver for converting said SG1, SG2, and SG3 optical signals into SG1, SG2, and SG3 RF signals, respectively;
said SG1, SG2, and SG3 signal processors further including post processors, respectively, for selectively maintaining the signal level of said SG1, SG2, and SG3 RF signals, respectively;
said SG1, SG2, and SG3 signal processors each further including a crossband coupler, respectively, for converting the SG1, SG2, and SG3 RF signals from said post processors into high and low frequency components, respectively;
SG1, SG2, and SG3 communication band processors, each including:
means for bandpass filtering said SG1, SG2, and SG3 high and low frequency components, respectively; and
means for power amplifying and level controlling said bandpassed SG1, SG2, and SG3 high and low frequency components, respectively;
a plurality of duplexers for bandpass filtering said power amplified and level controlled SG1, SG2, and SG3 high and low frequency components, and feeding the signals onto a common output line; and
an antenna distribution network connected to said common output line for receiving said power amplified and level controlled SG1, SG2, and SG3 high and low frequency components, for connection to at least one antenna.

9. The System of claim 8, wherein said antenna distribution network include:
a first directional coupler having a first port connected via said common output line to said plurality of duplexers for receiving therefrom the bandpass filtered power amplified level controlled SG1, SG2, and SG3 high and low frequency component RF signals, respectively, a second port for providing a relatively low level sample signal, and a third port for outputting a relatively high level portion of the received RF signals;
a second directional coupler having a first port for receiving RF signals from said third port of said first directional coupler, a second port for outputting a relatively low power portion of the RF signals, and a third port for outputting a relatively high power portion of received RF signals; and
a third directional coupler having a first port for receiving RF signals from the second port of said second directional coupler, a second port for bidirectionally coupling to Wi-Fi signals, and a third port for feeding and receiving the RF signals and Wi-Fi signals to and from a centrally located first antenna relative to the position of said RFN.

10. The System of claim 9, wherein said antenna distribution system further includes:
a splitter/combiner having a first port for connection to and receiving RF signals from the third port of said second directional coupler, and second and third ports for outputting split portions of the received RF signals, respectively;

a fourth directional coupler having a first port connected to receive RF signals from the second port of said splitter/combiner, a second port for bidirectionally coupling to Wi-Fi signals, and a third port for feeding and receiving RF signals and Wi-Fi signals to and from a second antenna located relative to a right side of said RFN Node; and a fifth directional coupler having a first port connected to receive RF signals from the third port of said splitter/combiner, a second port for bidirectionally coupling to Wi-Fi signals, and a third port for feeding and receiving RF signals and Wi-Fi signals to and from a third antenna located relative to a left side of said RFN Node.

11. The System of claim 10, further including an Ethernet/LAN subsystem connected to said second ports of said third through fifth directional couplers, respectively, for Wi-Fi services.

12. The System of claim 8, wherein each one of said plurality of RFN Nodes each further include:

said plurality of duplexers being further configured for receiving via said common output line user generated uplink SG1, SG2, and SG3 RF signals, respectively, and bandpass filtering these signals;

said SG1, SG2, and SG3 Communication Band Processors further include:

first means for both amplifying and level controlling said uplink SG1, SG2, and SG3 RF signals, respectively; and second means connected to an output of said first means for receiving and bandpass filtering the amplified and level controlled said uplink SG1, SG2, and SG3 RF signals, respectively;

said SG1, SG2, and SG3 signal processors being connected to said SG1, SG2, and SG3 Communication Band Processors, and including: first means for both amplifying and level controlling the bandpass filtered said uplink SG1, SG2, and SG3 RF signals, respectively; and second means connected to first means for converting the amplified and level controlled said uplink SG1, SG2, and SG3 RF signals, respectively, into respective optical signals;

said dedicated OMU Unit being connected to said SG1, SG2, and SG3 signal processors and including a second plurality of OADM multiplexers configured for multiplexing said uplink SG1, SG2, and SG3 optical signals for outputting on a single signal line.

13. The System of claim 12, wherein each of said first OMU Unit includes a second plurality of OADM multiplexers configured for connection to and receiving from a single signal line of said dedicated OMU Unit of an associated one of said plurality of RFN's the multiplexed said uplink SG1, SG2, and SG3 optical signals, whereby said first OMU demultiplexes these signals into individual uplink SG1, SG2, and SG3 optical signals.

14. The System of claim 13, wherein said first FTU-RF further includes:

a plurality of optical receivers for receiving from said first OMU Unit the individual said uplink SG1, SG2, and SG3 optical signals, respectively, and converting these signals into individual uplink SG1, SG2, and SG3 RF signals, respectively.

15. The System of claim 14, further including:

said first through third SCU Units further including:

a signal combiner for receiving and combining individual uplink SG1, SG2, and SG3 RF signals from said plurality of RFN Nodes, respectively;

an amplifier for amplifying the combined uplink SG1, SG2, and SG3 RF signals, respectively; and means for receiving and splitting the amplified combined uplink SG1, SG2, and SG3 RF signals for connection to associated said plurality of RIM's, respectively and said plurality of RIM's being operable for both maintaining the individual ones of said split uplink SG1, SG2, and SG3 RF signals at operable signal levels, and for connecting the signals to individual sectors of each one of first, second, and third Service Providers.

16. The System of claim 5, further including means connected to both said plurality of RIM modules, and said plurality of FTU Units, respectively, for providing an Ethernet LAN connection thereto, whereby said plurality of Service Group Providers, and users of the System are connected to said Ethernet LAN.

17. The System of claim 5, further including a Master Controller connected to said system for providing control signals, monitoring sampling signals, and issuing alarm signals.

18. The System of claim 5, further including means for connecting the system to the Internet for remote monitoring and control.

* * * * *